(12) United States Patent
Ehlers et al.

(10) Patent No.: US 9,333,380 B2
(45) Date of Patent: May 10, 2016

(54) VALVE FOR A FIRE EXTINGUISHING SYSTEM

(75) Inventors: Joshua L. Ehlers, Marinette, WI (US); Brian L. Counts, Green Bay, WI (US); Richard J. Biehl, Marinette, WI (US)

(73) Assignee: Tyco Fire Products LP, Lansdale, PA (US)

(*) Notice: Subject to any disclaimer, the term of this patent is extended or adjusted under 35 U.S.C. 154(b) by 424 days.

(21) Appl. No.: 13/814,469

(22) PCT Filed: Aug. 9, 2011

(86) PCT No.: PCT/US2011/047136
§ 371 (c)(1),
(2), (4) Date: Jun. 20, 2013

(87) PCT Pub. No.: WO2012/021549
PCT Pub. Date: Feb. 16, 2012

(65) Prior Publication Data
US 2013/0255971 A1    Oct. 3, 2013

Related U.S. Application Data

(60) Provisional application No. 61/371,889, filed on Aug. 9, 2010.

(51) Int. Cl.
*A62C 2/00* (2006.01)
*A62C 37/36* (2006.01)
(Continued)

(52) U.S. Cl.
CPC .................. *A62C 3/07* (2013.01); *A62C 35/023* (2013.01); *A62C 35/68* (2013.01); *A62C 37/42* (2013.01); *F16K 17/162* (2013.01); *F16K 17/1626* (2013.01)

(58) Field of Classification Search
CPC ........ A62C 3/07; A62C 35/023; A62C 37/42; A62C 35/68; F16K 17/1626; F16K 17/162

USPC ...................................................... 169/46, 19
See application file for complete search history.

(56) References Cited

U.S. PATENT DOCUMENTS 3,209,937 A    10/1965  Hirst et al.
3,647,109 A     3/1972  Hebblethwaite
(Continued)

FOREIGN PATENT DOCUMENTS

GB          687 732       2/1953
WO       WO 96/36398    11/1996

OTHER PUBLICATIONS

International Searching Authority, International Search Report and Written Opinion issued in International Application No. PCT/US2011/047136, Dec. 8, 2011, 10 pages.
(Continued)

*Primary Examiner* — Len Tran
*Assistant Examiner* — Steven M Cernoch
(74) *Attorney, Agent, or Firm* — Perkins Coie LLP

(57) ABSTRACT

A valve for a fire extinguishing system includes a housing, a flow control apparatus, an actuator apparatus, and a manual override apparatus. The flow control apparatus is disposed in a cavity to prevent or permit flow of the fire extinguishing agent from an ingress aperture to an egress aperture of the housing. The flow control apparatus includes a burst disk clamped between the first and second annular faces and an annular spool axially movable along the longitudinal axis relative to the housing. The actuator apparatus includes a bearing sleeve angularly movable around a longitudinal axis relative to the housing and a latch element operably coupling the bearing sleeve and the annular spool. The manual override apparatus includes a cam operably coupled to the bearing sleeve.

43 Claims, 18 Drawing Sheets

(51) Int. Cl.
  *A62C 3/07* (2006.01)
  *A62C 35/02* (2006.01)
  *A62C 35/68* (2006.01)
  *A62C 37/42* (2006.01)
  *F16K 17/16* (2006.01)

(56) References Cited

U.S. PATENT DOCUMENTS

| | | | | |
|---|---|---|---|---|
| 3,915,237 A | * | 10/1975 | Rozniecki | 169/62 |
| 4,245,660 A | * | 1/1981 | Rozniecki | 137/68.13 |
| 4,430,392 A | * | 2/1984 | Kelley et al. | 429/53 |
| 4,580,589 A | * | 4/1986 | Le Bras et al. | 137/68.25 |
| 4,682,619 A | * | 7/1987 | Clift et al. | 137/68.26 |
| 4,830,052 A | * | 5/1989 | Oberlin et al. | 137/68.24 |
| 5,421,609 A | * | 6/1995 | Moore et al. | 280/737 |
| 6,131,599 A | * | 10/2000 | DeGood et al. | 137/70 |
| 2005/0205129 A1 | * | 9/2005 | Karalis et al. | 137/68.13 |
| 2009/0000406 A1 | * | 1/2009 | Brazier et al. | 73/865.8 |

OTHER PUBLICATIONS

Jan. 14, 2016 IFW of Provisional U.S Appl. No. 61/371,889, filed Aug. 9, 2010.

* cited by examiner

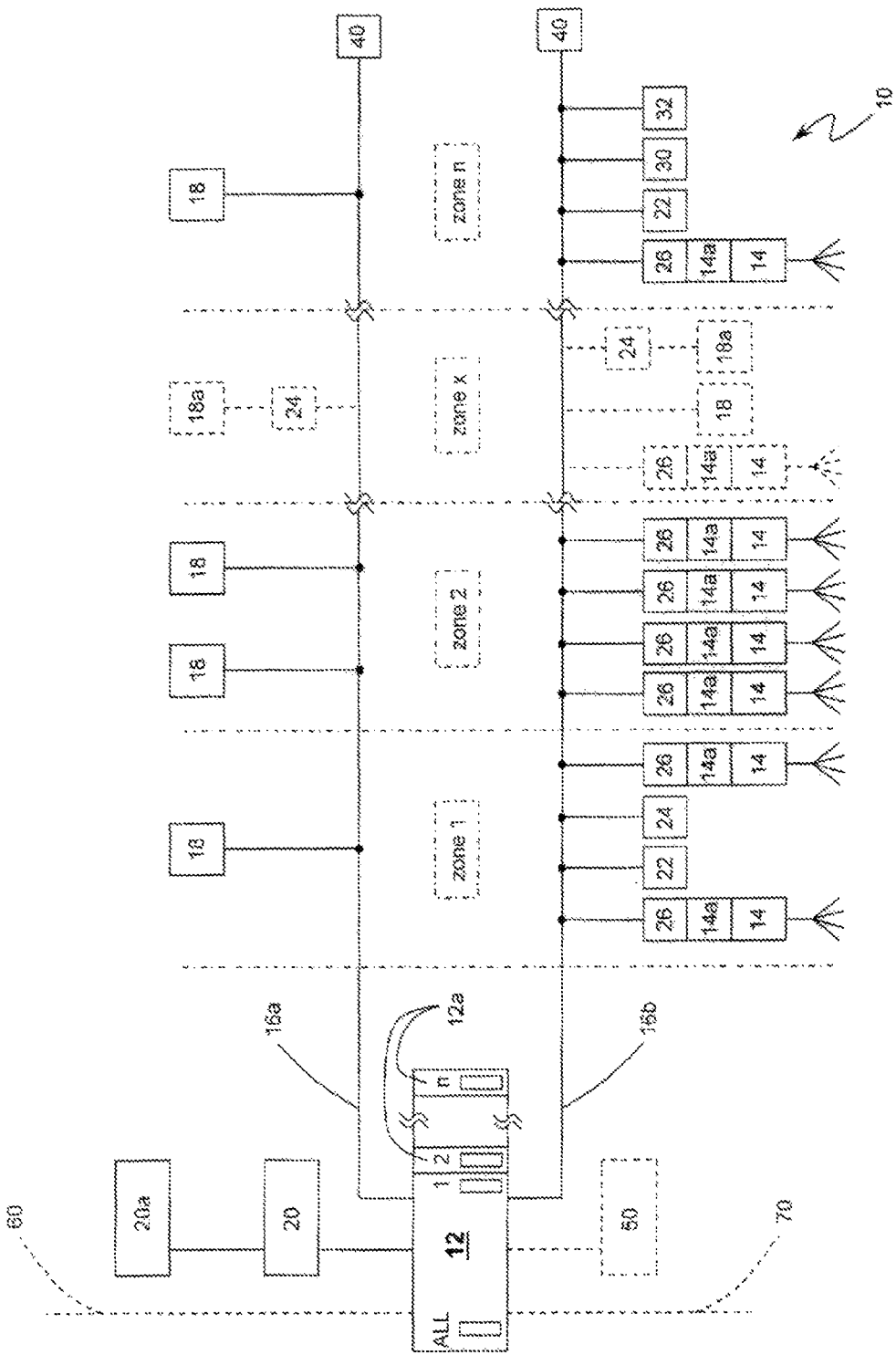

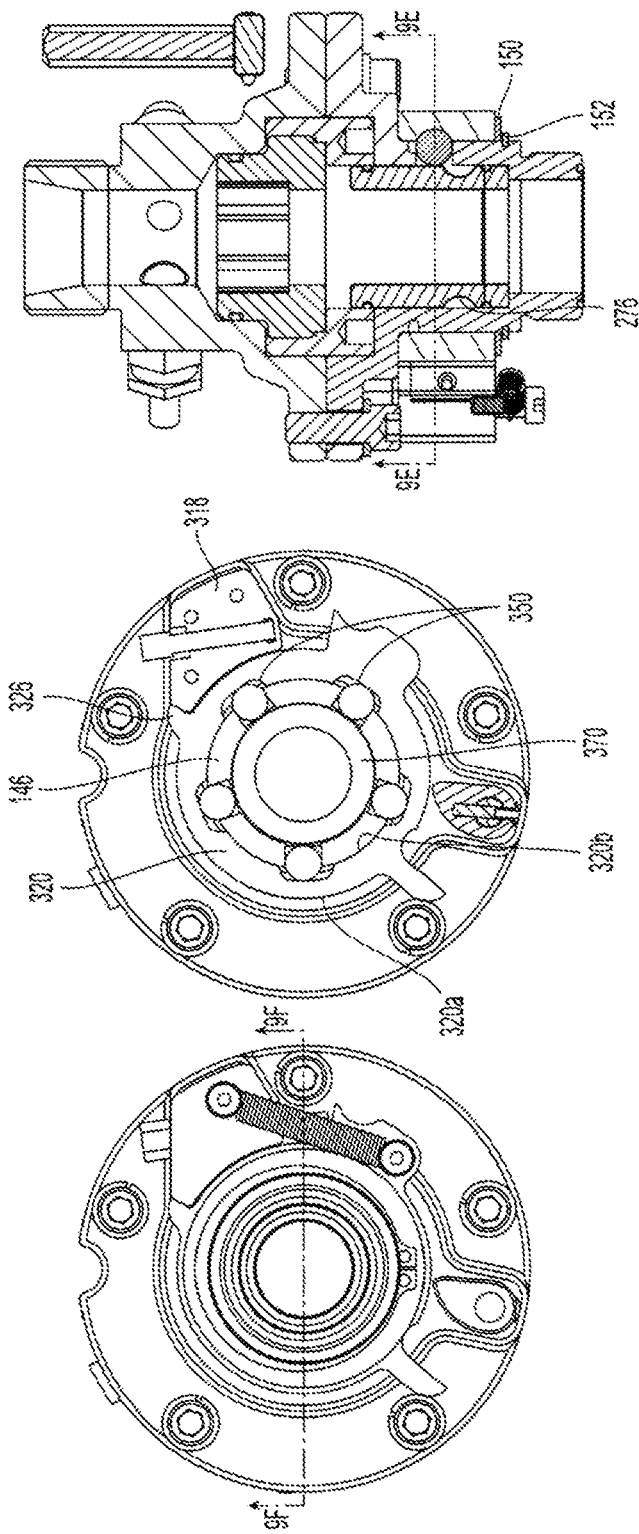

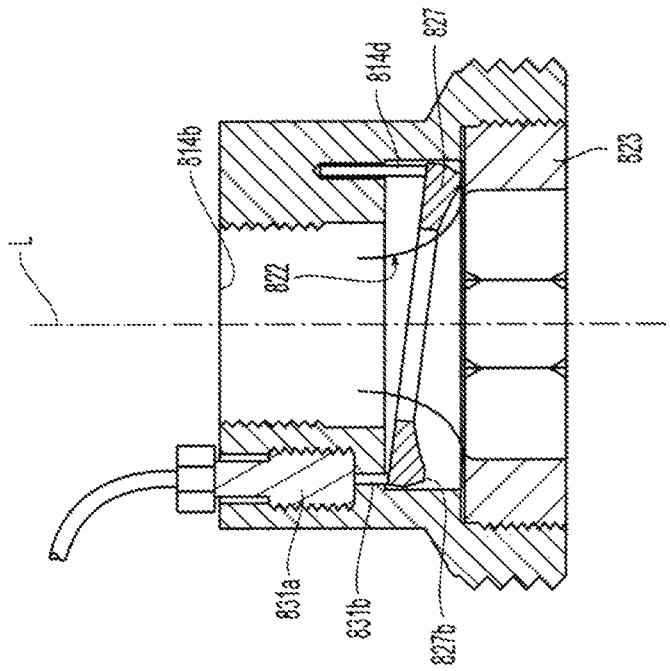
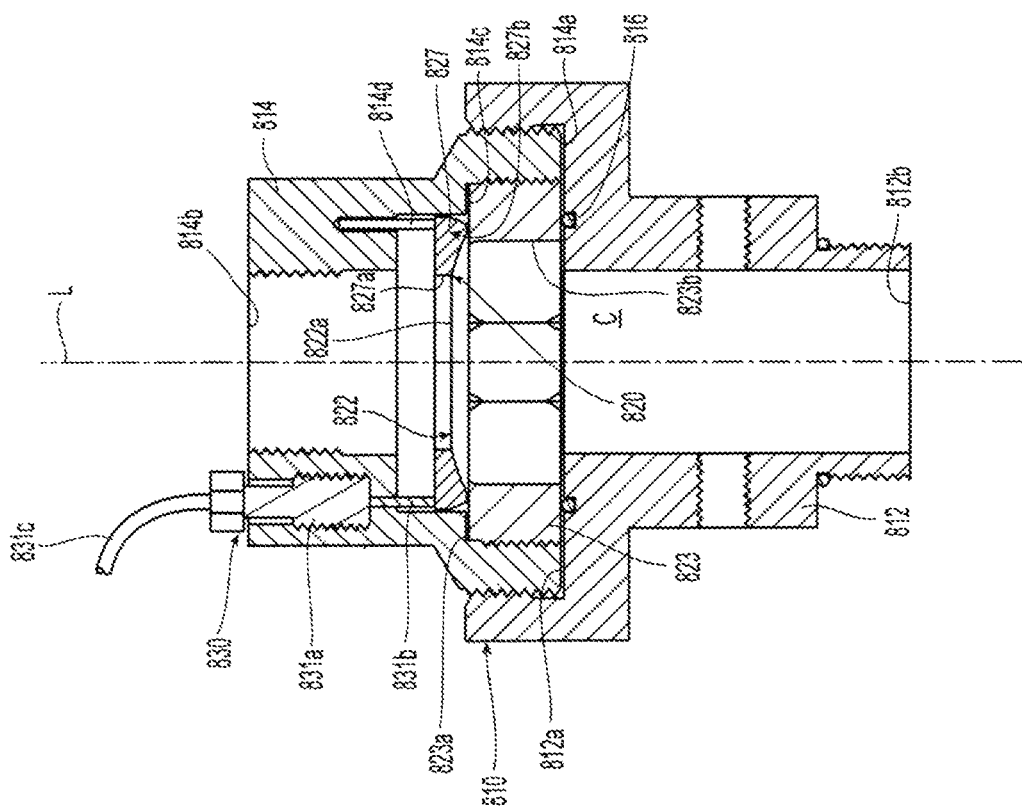
Fig. 14A
Fig. 14B

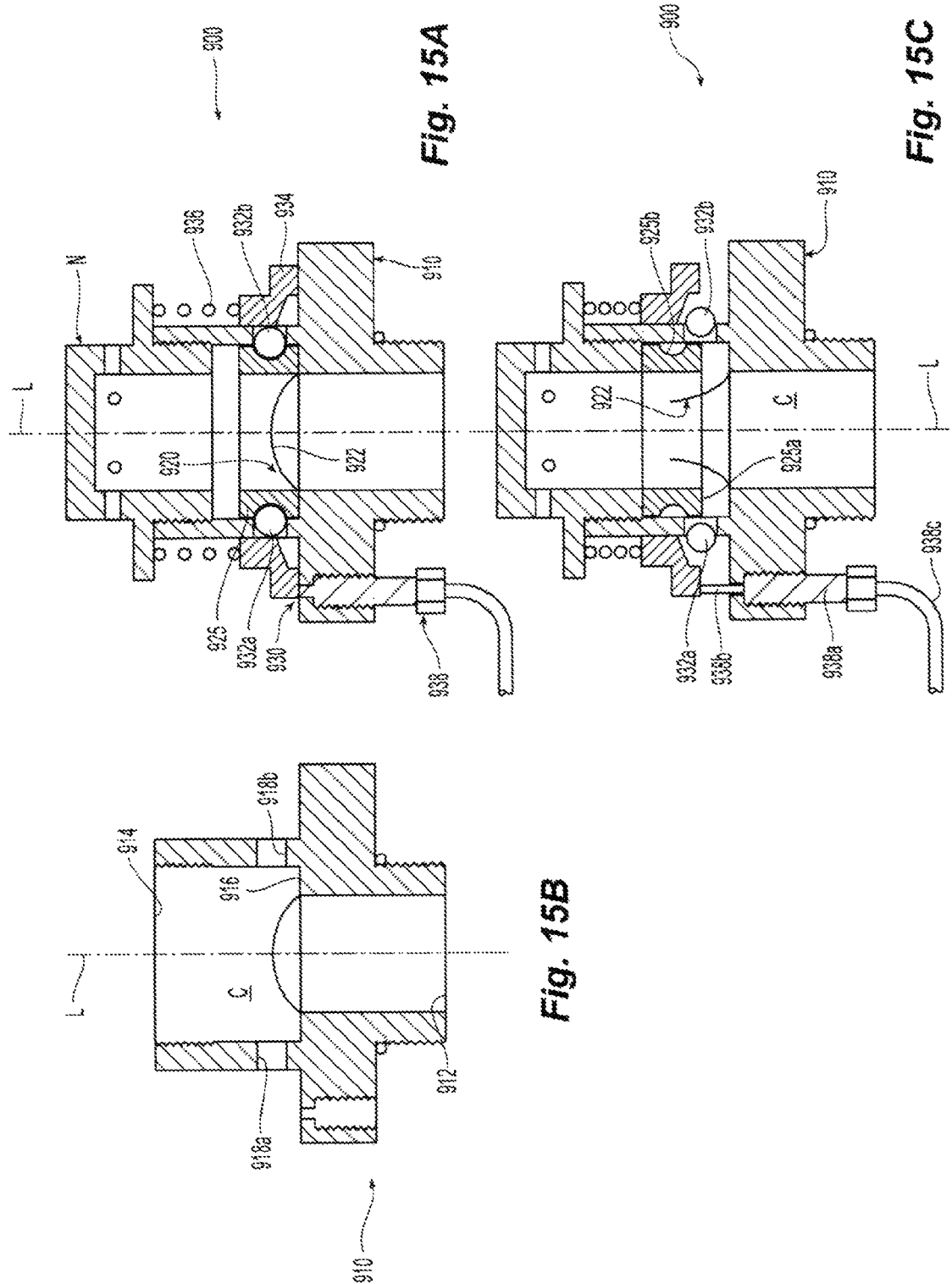

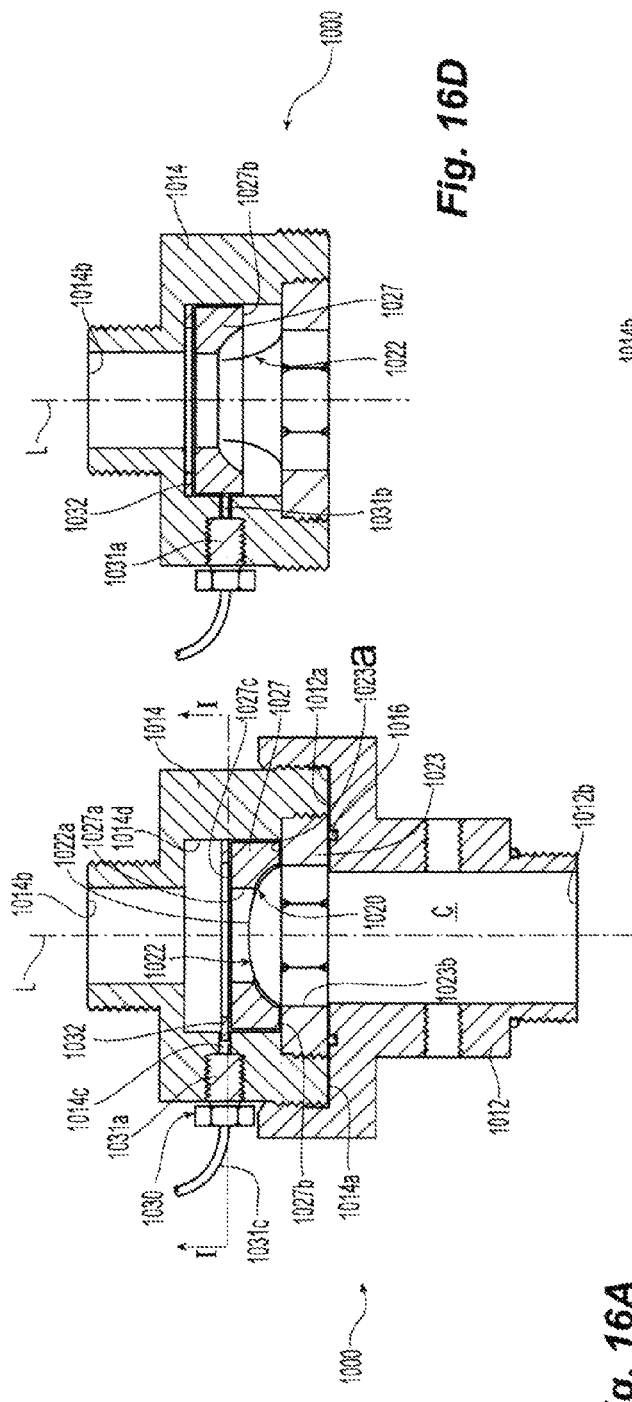
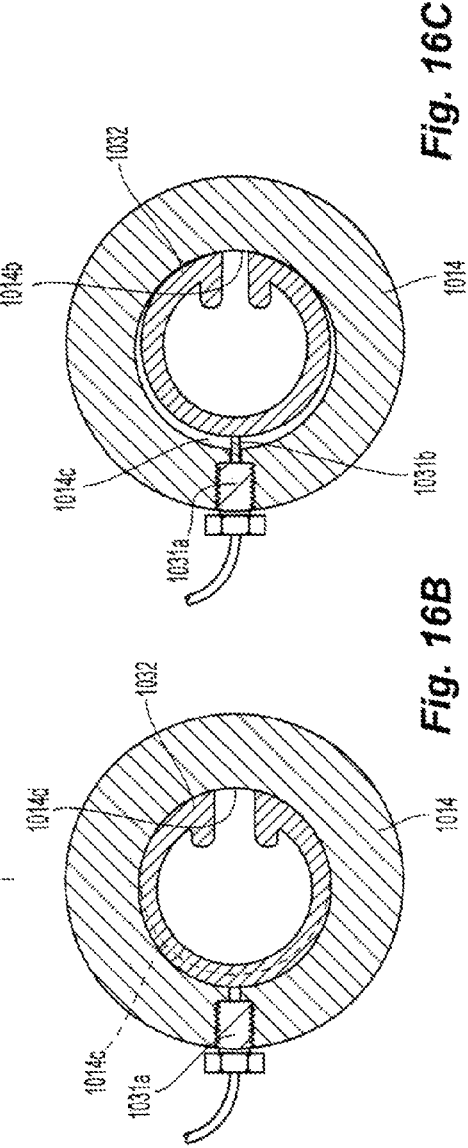
Fig. 16A
Fig. 16B
Fig. 16C
Fig. 16D

VALVE FOR A FIRE EXTINGUISHING SYSTEM

CROSS-REFERENCE TO RELATED APPLICATION(S)

This patent application claims the benefit under 35 U.S.C. §119 of U.S. Provisional Patent Application No. 61/371,889, filed on 9 Aug. 2010, entitled "Valve for a Fire Extinguishing System," which is incorporated herein in its entirety by reference.

BACKGROUND OF THE INVENTION

Conventional systems for extinguishing a fire onboard a vehicle may dispense extinguishing agents, e.g., heptafluoropropane and/or sodium bicarbonate, in a similar manner. The primary differences among these conventional systems are in the number of components that each system includes and in the quantity of extinguishing agent that each system contains. These conventional systems may also include reserve or secondary systems that are identical to the primary systems.

Conventional automatic systems may be used to protect an area, e.g., a passenger compartment of a vehicle, against slow growth and rapidly developing petroleum, oil, and lubricant (POL) type fires by utilizing a combination of heptafluoropropane and sodium bicarbonate.

SUMMARY OF THE INVENTION

The present invention is directed to a valve for a fire extinguishing agent. The valve allows the fire extinguishing agent to flow from a chamber due to a change in the effective clamping/supporting perimeter on a burst disk. The valve includes arrangements that allow for the movement of a support member in response to an actuation signal. Movement of the support member changes the effective supporting perimeter on the burst disk.

Preferred embodiments provide a valve for dispensing a fire extinguishing agent from a container. According to aspects of the invention, the valve includes a housing including an ingress aperture and an egress aperture, a rupturable disk, an annular spool, and an actuator operably coupled to the spool. The housing defines a cavity that extends along a longitudinal axis between the ingress and egress apertures. The rupturable disk is disposed in the cavity to control a flow of fire extinguishing agent from the ingress aperture to the egress aperture. The rupturable disk has a line of weakness at least partially disposed around the longitudinal axis and a burst rating greater than a maximum pressure of the fire extinguishing agent in the container. The annular spool defines a flow-through aperture along the longitudinal axis. The annular spool has an axial face that engages the rupturable disk in a latched position of the annular spool along the longitudinal axis. The annular spool supports the rupturable disk and conceals the line of weakness from the ingress aperture in the latched position. The actuator releases the spool along the longitudinal axial to a fired position that exposes the line of weakness, thereby allowing the fire extinguishing agent to flow through an aperture defined by the spool and through the egress aperture of the housing. Preferably, the fire extinguishing agent flows longitudinally through the spool.

Preferred embodiments provide a valve for a fire extinguishing system that dispenses a fire extinguishing agent. According to aspects of the invention the valve includes a housing, a flow control apparatus, an actuator apparatus, and a manual override apparatus. The housing includes ingress and egress apertures and defines a cavity that extends along a longitudinal axis between the ingress and egress apertures. The flow control apparatus is disposed in the cavity to prevent or permit flow of the fire extinguishing agent from the ingress aperture to the egress aperture. The flow control apparatus includes a burst disk having a central dome surrounded by a generally planar annulus, an inlet ring and an outlet ring. The inlet ring includes a first annular face contiguously engaging a first side of the generally planar annulus. The outlet ring includes a second annular face contiguously engaging a radially outer portion of a second side of the generally planar annulus. Accordingly, a radially outer portion of the generally planar annulus is clamped between the first and second annular faces. The actuator apparatus includes an electromechanical actuator, a bearing sleeve angularly movable around the longitudinal axis relative to an outside of the housing, an annular spool axially movable along the longitudinal axis relative to an inside of the housing, and a latch element operably coupling the bearing sleeve and the annular spool. The manual override apparatus includes a lever pivotally disposed on the housing and a cam operably coupled to the lever and the bearing sleeve.

Preferred embodiments also provide a method of controlling a flow of a fire extinguishing agent in a passage. The passage extends along a longitudinal axis from an ingress aperture to an egress aperture. A disk occludes the passage to prevent the flow of the extinguishing agent from the ingress aperture to the egress aperture in a first arrangement, and the disk ruptures to permit the flow of the extinguishing agent from the ingress aperture to the egress aperture in a second arrangement. The disk has a line of weakness that at least partially cinctures the longitudinal axis. According to aspects of the invention, the method includes concealing the line of weakness between first and second annular faces in the first arrangement and revealing the line of weakness by moving the first annular face relative to the second annular face in the second arrangement.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 1 is a schematic drawing illustrating a preferred embodiment of an automatic fire suppressing system. The automatic fire suppressing system preferably includes one to n zones, which are demarcated by dash-dot lines. Dash lines illustrate optional arrangements in a zone x, which may be any one of the zones.

FIGS. 9A-9F illustrate a fired configuration of a preferred embodiment of the valve assembly shown in FIG. 3.

FIG. 11A illustrates a latched configuration and FIG. 11B illustrates a fired configuration.

FIG. 12A illustrates a latched configuration and FIG. 12B illustrates a fired configuration.

FIG. 13A illustrates a latched configuration and FIG. 13B illustrates a fired configuration.

FIGS. 14A and 14B illustrate yet a further preferred embodiment of a valve assembly of the extinguisher assembly shown in FIGS. 2A-2D. FIG. 14A illustrates a latched configuration and FIG. 14B illustrates a fired configuration.

FIGS. 15A-15C illustrate again another preferred embodiment of a valve assembly of the extinguisher assembly shown in FIGS. 2A-2D. FIG. 15A illustrates a latched configuration, FIG. 15B is a detail view of a disposable housing for the valve assembly incorporating a disk welded in place, and FIG. 15C illustrates a fired configuration.

FIGS. 16A-16D illustrate yet again another preferred embodiment of a valve assembly of the extinguisher assembly shown in FIGS. 2A-2D. FIG. 16A illustrates a latched configuration, FIGS. 16B and 16C are cross-section views taken along line I-I in FIG. 16A, and FIG. 16D illustrates a fired configuration.

DETAILED DESCRIPTION OF THE PREFERRED EMBODIMENTS

Figure 2A:
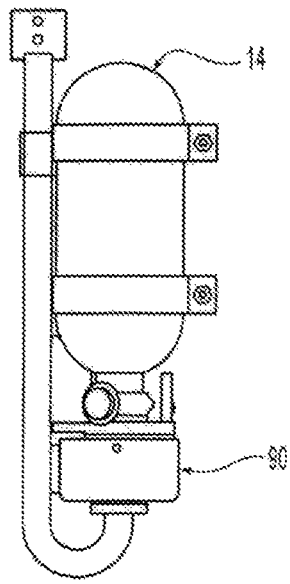
FIGS. 2A-2D are front, left-side, back and right-side elevation views of a preferred embodiment of an extinguisher assembly of the automatic fire extinguishing system shown in FIG. 1.
Figure 2B:
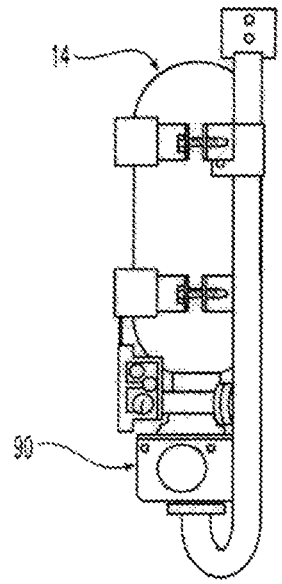
Figure 2C:
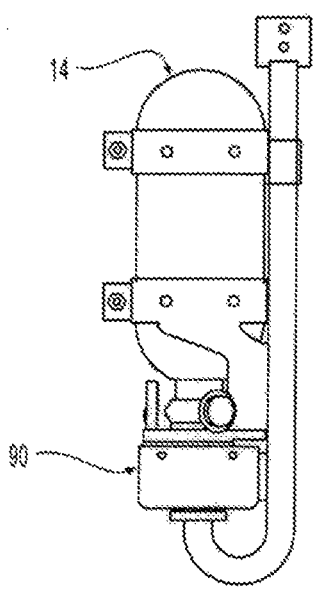
Figure 2D:
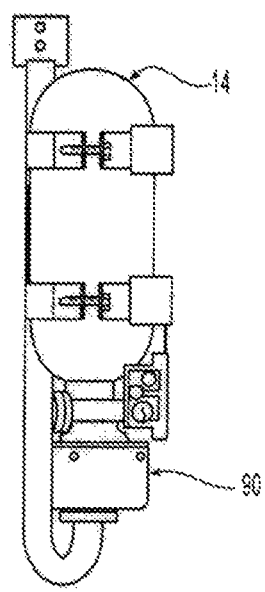
Figure 3:
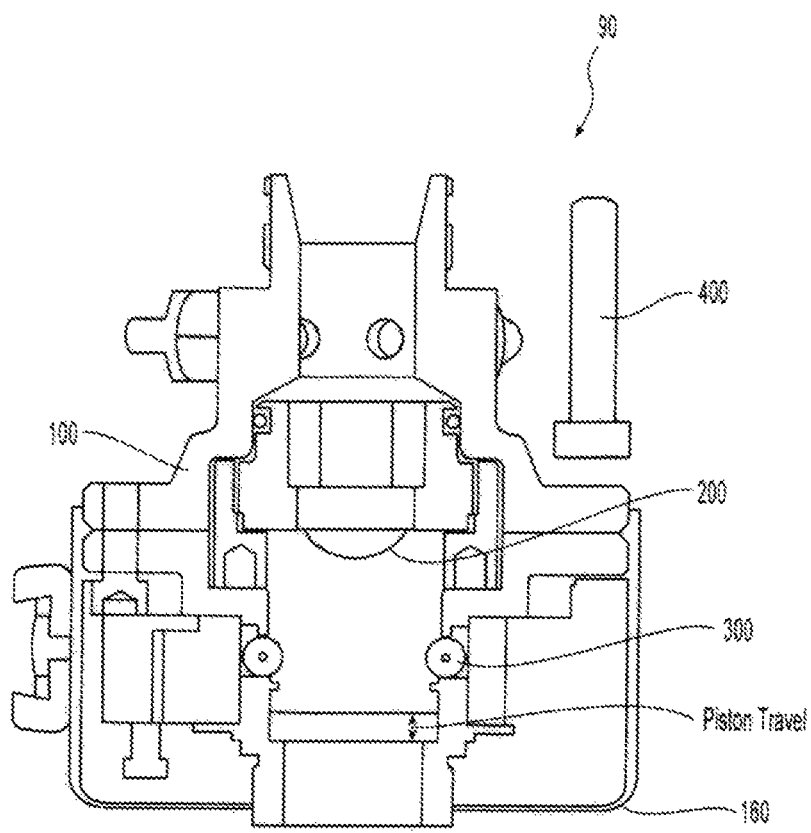
FIG. 3 is a cross-sectional view of a preferred embodiment of a valve assembly of the extinguisher assembly shown in FIGS. 2A-2D.

As installed, an automatic fire extinguishing system (AFES) is preferably provided onboard a vehicle (not shown) and is supplied with one or more fire extinguishing agents that are discharged in response to detecting a fire threat. Preferred embodiments include high-speed valves for discharging the fire extinguishing agent(s).

FIG. 1 schematically shows an individual AFES 10 according to a preferred embodiment. AFES 10 includes an ECM 12, at least one suppressor assembly 14 (seven are shown with solid lines and one is shown with dash line in FIG. 1), and a wire harness assembly preferably including a first communications wiring harness 16a and a second communications wiring harness 16b. Each suppressor assembly 14 is associated with a release module 26 that communicates with ECM 12 via second wire communication wiring harness 16b. Each release module 26 may control a single suppressor assembly 14 or plural suppressor assemblies 14 (not shown). AFES 10 preferably also includes at least one detection device such as an optical sensor 18 (four are shown with solid lines and one is shown with dash line in FIG. 1), a linear detection wire, and/or a spot thermal detector. Reference number 18a in zone x preferably denotes one or the other of another optical sensor, the linear detection wire and the spot thermal detector, any of which may be coupled to either the first communications wiring harness 16a and a second communications wiring harness 16b. Options for AFES 10 preferably include mounting hardware, a battery backup module 20, remote discharge switch(s) 22 (two are shown in FIG. 1), one or more additional detection modules 24 (one is shown with solid lines and two are shown with dash line in FIG. 1), one or more relay modules 30, and one or more notification modules 32. Preferably, detection module 24 may provide a coupling for a linear detection wire, a spot thermal detector, or another sensor that would otherwise not be able to communicate with ECM 12. A terminator module 40 is preferably installed at the end of each communications wiring harness to complete an electrical loop that allows ECM 12 to communicate with the components on the communications wiring harness.

Preferably, AFES 10 may protect additional areas or different zones within an area by using one or more optional zone modules 12a (two are shown in FIG. 1) coupled to ECM 12. A "zone" is preferably a specific compartment, group of compartments, or hazard area that is to be protected. Examples of zones include a crew cab, an engine compartment, a cargo bay, an egress portal, a wheel well, etc. In some vehicles, multiple compartments can be protected as one zone if, for example, a comparable hazard exists in each compartment.

ECM 12 includes monitoring and controlling for one protection zone having at least one suppressor assembly 14. Preferably, each zone has a maximum of four suppressor assemblies 14 that ECM 12 controls, e.g., see zone 2 in FIG. 1. Certain other embodiments according to the present disclosure may include more than four suppressor assemblies in a zone. ECM 12 is preferably expanded with one or more zone modules 12a for monitoring and controlling additional protection zone. Preferably, a maximum of seven zone modules 12a may be added side-by-side to ECM 12 for monitoring and controlling a total of eight protection zones. Certain other embodiments according to the present disclosure may include more than eight protection zones.

FIGS. 2A-2D show four elevation views of a preferred embodiment of an extinguisher assembly for discharging one or more extinguishing agents in response to a signal from the ECM 12. Extinguisher assemblies 14 preferably are available in three different cylinder sizes and are identified as Class I, Class II, or Class III. The cylinders are preferably non-shatterable per MIL-DTL-7905H. The different extinguisher assemblies 14 preferably include a common extinguisher module that preferably is connected to the ECM 12 and/or a pressure sensor on the extinguisher assembly 14. The extinguisher module is also connected to a protracting actuation device (PAD) as will be described in detail below. When the extinguisher module receives a signal from the ECM 12, the extinguisher module sends an electrical pulse to the PAD to actuate a valve 90, preferably including a burst disc, and discharges the agent in less than about 270 milliseconds. The extinguishing agent(s) are preferably discharged from the extinguisher assemblies 14 in less than about 270 milliseconds. Preferably, the extinguishing agent(s) are discharged from Class I and II cylinders in less than about 100-130 milliseconds and from Class III cylinders in less than about 180 milliseconds. The extinguisher module preferably communicates with the pressure sensor and ECM 12 to confirm activation and cylinder discharge.

A common high-speed valve assembly 90 is preferably coupled to each extinguisher cylinder. The high speed valve assembly 90 preferably includes a pressure gauge for visually identifying the cylinder pressure, a fill valve that preferably also serves to relieve cylinder pressure, a cylinder pressure sensor, and an over-pressure relief device. Preferably, a manual override apparatus including a release lever is also located on the valve assembly 90. The valve assembly 90 is preferably made of a light weight alloy providing exceptional performance within a light weight package.

FIGS. 3-10B show a preferred embodiment of the valve assembly 90 for discharging the extinguishing agent(s) from a cylinder in response to a signal from the ECM 12. The valve assembly 90 includes a housing 100, a flow control apparatus 200, an actuator apparatus 300, and a manual override apparatus 400.

The housing 100 preferably includes a valve base 120 and a valve body 140. Preferably, the valve base 120 includes a base flange 122 and the valve body 140 includes a body flange 142. An assembled arrangement of the housing 100 preferably includes the base flange 122 matingly engaging the body flange 142. The flanges 122 and 142 may be releasably coupled by one or more fasteners. Preferably, the flanges 122 and 142 are coupled together by a plurality of bolts. Preferably, a shroud 160 is coupled to the housing 100 for protecting portions of the actuator and manual override apparatuses 300 and 400, as best seen in FIG. 10.

The valve base 120 includes an ingress aperture 124 and the valve body 140 includes an egress aperture 144. Fire extinguishing agent(s) from the cylinder pass through the ingress aperture 124 into the valve assembly 90 and subsequently pass through the egress aperture 144 from the valve assembly 90 to be dispersed by a nozzle. In the assembled arrangement of the housing 100, the valve base 120 and the valve body 140 define a cavity C that extends along a longitudinal axis L between the ingress aperture 124 and the egress aperture 144.

The housing 100 preferably includes connections for a pressure gauge 104, a fill valve 106, an over-pressure relief valve 108, and a pressure transducer 110. Preferably, the valve base 120 includes at least one tap 126 for these connections.

Figure 4A:
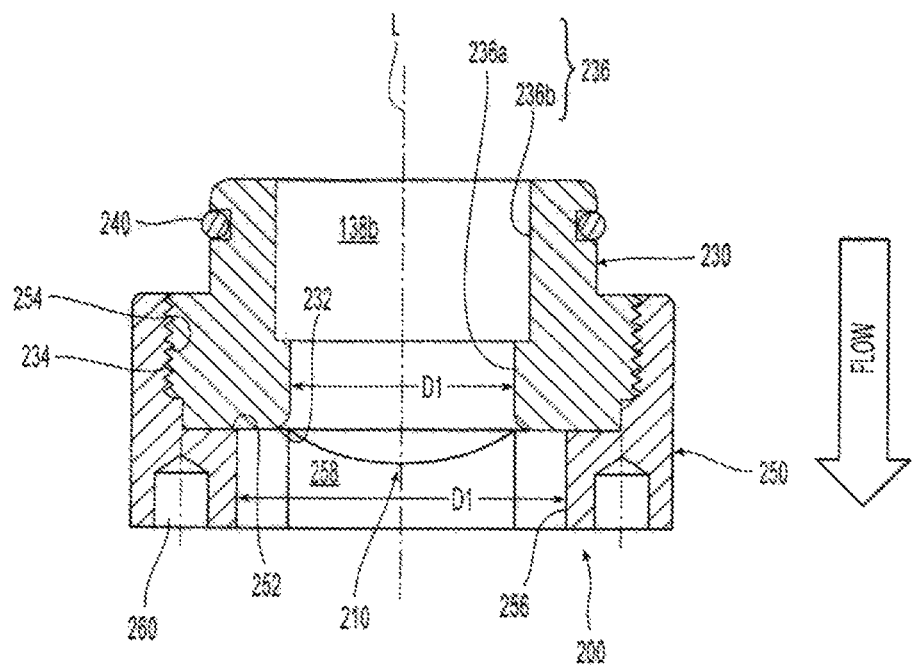
FIG. 4A is a cross-sectional view of a preferred embodiment of a burst disk cassette of the valve assembly shown in FIG. 3.

With particular reference to FIG. 4A, a flow control apparatus 200 is disposed in the cavity C for preventing or permitting flow of the fire extinguishing agent(s) from the ingress aperture 124 to the egress aperture 144. Flow is prevented in a latched configuration of the valve 90 and is permitted in a fired configuration of the valve 90. The flow control apparatus 200 preferably includes a burst disk 210 sandwiched between an inlet ring 230 and an outlet ring 250. Preferably, the inlet ring 230 includes a first annular clamp face 232 and male threads 234, the outlet ring 250 includes a second annular clamp face 252 and female threads 254, and the first and second annular clamp faces 232 and 252 move toward and away from one another in response to relative rotation of the male and female threads 234 and 254.

The inlet ring 230 includes an inside surface 236 that cinctures an inlet throat 238. The inside annular surface 236 includes first and second axial cross-sections 236a and 236b. Preferably, the first axial cross-section 236a is circular with a first diameter D1 and the second axial cross-section 236b has a shape that accepts a tool (not shown) to apply torque for rotating the inlet ring 230 relative to the outlet ring 250. The second axial section 236b preferably includes a hexagonal cross-section that is larger than the first diameter D1. The first diameter D1 may be approximately 0.50-1.50 inches and particularly approximately 0.75-1.25 inches. Preferably, the first diameter is approximately 1.00 inch. The inlet throat 238 preferably includes a first portion cinctured by the valve base 120 and a second portion cinctured by the inlet ring 230. The inlet ring 230 preferably also includes a seal 240, e.g., an O-ring, for cooperatively engaging the valve base 120 to provide a pressure-tight seal between the housing 100 and the flow control apparatus 200.

The outlet ring 250 includes an inside surface 256 that cinctures an outlet throat 258. The inside surface 256 preferably has a circular cross-section with a second diameter D2 that is larger than the first diameter D1. The second diameter D2 may be approximately 1.00-2.00 inches and particularly approximately 1.25-1.75 inches. Preferably, the second diameter D2 is approximately 1.50 inches. Accordingly, the second annular clamp face 252 overlies only a radially outer portion of the first annular clamp face 232. The outlet throat 258 preferably includes a first portion cinctured by the valve body 140 and a second portion cinctured by the outlet ring 250. Preferably, the outlet ring 250 includes a fitting 260 to apply torque for rotating outlet ring 250 the relative to the inlet ring 230. The fitting 260 is preferably a plurality of holes that accept a tool such as spanner wrench (not shown).

Figure 4B:
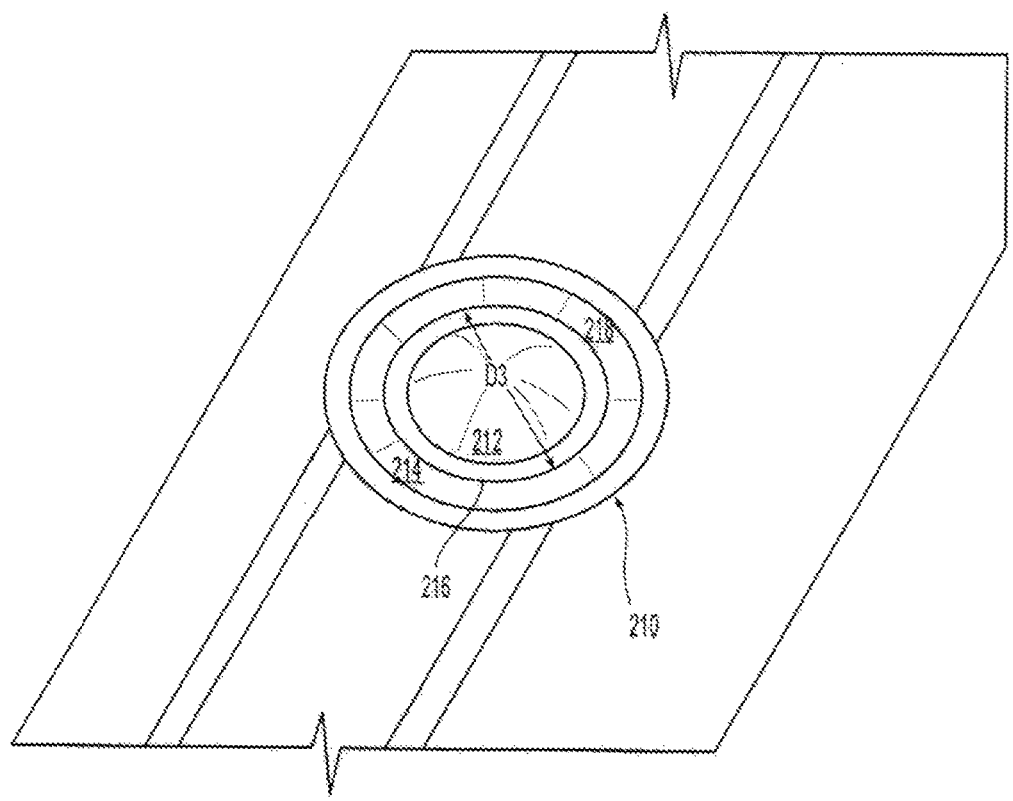
FIG. 4B illustrates a preferred embodiment of a burst disk of the valve assembly shown in FIG. 3.

With particular reference to FIG. 4B, the burst disk 210 preferably includes a central dome 212 that is surrounded by a generally planar annulus 214. The intersection of the dome 212 and the annulus 214 has a diameter approximately equal to the first diameter D1. A radially outer portion of the annulus 214 is clamped between the first and second annular clamp faces 232 and 252. Preferably, a radially inner portion of the annulus 214 is contiguously disposed against the first annular clamp faces 232. The dome 212 is preferably preformed before the burst disk 210 is sandwiched between the first and second clamping faces 232 and 252. Preferably, the dome 212 is formed with a pressure in excess of that at which the burst disk 210 is designed to rupture. Accordingly, the burst disk 210 is pre-tested to withstand at least the pressure in the inlet throat 238 due to the pressure of a charged cylinder. Alternative burst disks may be generally flat or have central portions including shapes other than domes. The burst disk 210 preferably includes a high-performance, austenitic nickel-chromium-based alloy, e.g., Inconel®, or other material(s) suitable for a burst disk.

The burst disk 210 also includes a rupture line 216 that is preferably provided on the radially inner portion of the planar annulus 214. The rupture line 216 is a line of weakness along which the material of the burst disk 210 is predisposed to tear in response to subjecting the burst disk to a set of conditions. Preferably, the rupture line 216 is provided by a mechanical process (e.g., scoring), a chemical process (e.g., etching), or an electrical process (e.g., using a laser). The rupture line 216 is preferably located on the burst disk 210 at a third diameter D3 that is greater than the first diameter D1 and less than the second diameter D2. Accordingly, the third diameter D3 may be approximately 0.75-1.75 inches and particularly approximately 1.00-1.50 inches. Preferably, the third diameter D3 is approximately 1.25 inches.

The rupture line 216 preferably includes one or more segments disposed angularly around the longitudinal axis L. A single rupture line 216 preferably extends around the longitudinal axis L approximately 270-330 degrees and particularly approximately 285-315 degrees. Preferably, a single rupture line 216 extends approximately 300 degrees around the longitudinal axis L. The radially inner portion of the annulus 214 accordingly includes at least one area 218 between ends of the rupture line(s) 216 that lack a line of weakness. These area(s) 218 preferably provide a hinge line when the burst disk 210 ruptures. Accordingly, the area(s) 218 provide a bend line and/or retain fragments of a ruptured burst disk 210. A single area 218 preferably extends around the longitudinal axis L 30-90 degrees and particularly approximately 45-75 degrees. Preferably, a single area 218 extends approximately 60 degrees around the longitudinal axis L. As one possible alternative, a segmented rupture line 216 may be intermittently disposed around the longitudinal axis L such that a plurality of areas 218 between the segments may provide a plurality of bend lines and/or fragment retainers. According to another possible alternative, the rupture line 216 cinctures the longitudinal axis L and rupturing the burst disk 210 completely tears the central dome 212 from the planar annulus 214.

The flow control apparatus 200 preferably also includes an annular spool 270 that moves along the longitudinal axis L with respect to the burst disk 210. Preferably, the spool 270 has an inside diameter approximately equal to the first diameter D1 of the inlet ring 230. Accordingly, generally only the dome 212 of the burst disk 210 is apparent in the latched configuration of the valve 90 when viewed along the longitudinal axis L looking into the inlet and outlet throats 238 and 258. Preferably, the spool 270 also includes approximately fluid-tight seals 272a and 272b with respect to the outlet ring 250 and the valve body 140, respectively.

The spool 270 preferably also includes an annular axial face 274 that presses the radially inner portion of the planar annulus 214 against the first annular clamp face 232 in the latched configuration of the valve 90. Accordingly, the rupture line 216 is concealed between the first annular clamp face 232 and the annular axial face 274, and clamp diameters acting on opposite sides of the planar annulus 214 are approximately the same. Specifically, the inside diameter of the first annular clamp face 232 acting a first side of the annulus 214 is approximately equivalent to the inside diameter of the annular axial face 274 acting on the second side of the annulus 214.

The annular axial face 274 separates from the radially inner portion of the planar annulus 214 in the fired configuration of the valve 90. Accordingly, the rupture line 216 is revealed and the clamp diameters acting on the opposite sides of the planar annulus 214 are different. Preferably, the diameter of the first annular clamp face 232 acting the first side of the annulus 214 is unchanged whereas the relatively larger diameter of the second annular clamp face 258 is the only clamping force acting on the second side of the annulus 214 because the annular axial face 274 no longer acts on the second side of the annulus 214. Changing the effective clamping diameter, revealing the rupture line 216, and/or the pressure differential between the inlet and outlet throats 238 and 258 subjects the burst disk 210 to a set of conditions that ruptures the burst disk 210 and permits the fire extinguishing agent(s) to flow along the longitudinal axis L. Preferably, the discharge of the fire extinguishing agent(s) is through the annular spool 270.

An example of a burst disk according to a preferred embodiment of the present invention includes an approximately 2.00 inch diameter Inconel® disk with an approximately 1.25 inch diameter rupture line that angularly extends approximately 300 degrees. More than 1,000 pounds-per-square-inch (PSI) of pressure will not rupture this burst disk if it is supported in a 1.00 inch diameter clamp; however, less than 500 PSI of pressure will rupture this burst disk if it is supported in a 1.50 inch diameter clamp. Preferably, more than 1,150 PSI of pressure will not rupture the exemplary burst disk when supported in the 1.00 inch diameter clamp, but less than 425 PSI of pressure will rupture the disk when supported in the 1.50 inch diameter clamp.

Figure 5A:
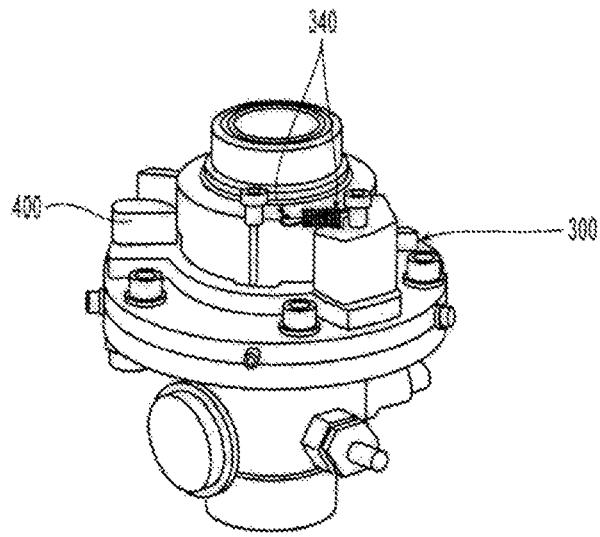
FIGS. 5A and 5B illustrate a preferred embodiment of the valve assembly shown in FIG. 3.
Figure 5B:
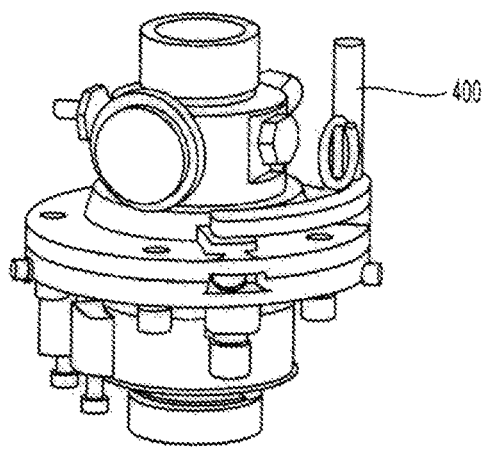

FIGS. 5A and 5B illustrate preferred embodiments for operating the flow control apparatus 200 to permit one or more extinguishing agents to be discharged. In particular, discharging the extinguishing agent(s) is permitted when the burst disk 210 is ruptured, preferably in response to the actuator apparatuses 300 receiving a discharge signal from the ECM or a decision being made to operate the manual override apparatus 400.

Figure 6A:
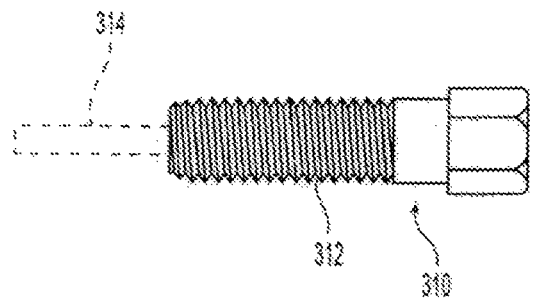
FIG. 6A illustrates a preferred embodiment of an electromechanical actuator of the valve assembly shown in FIG. 3.
Figure 6B:
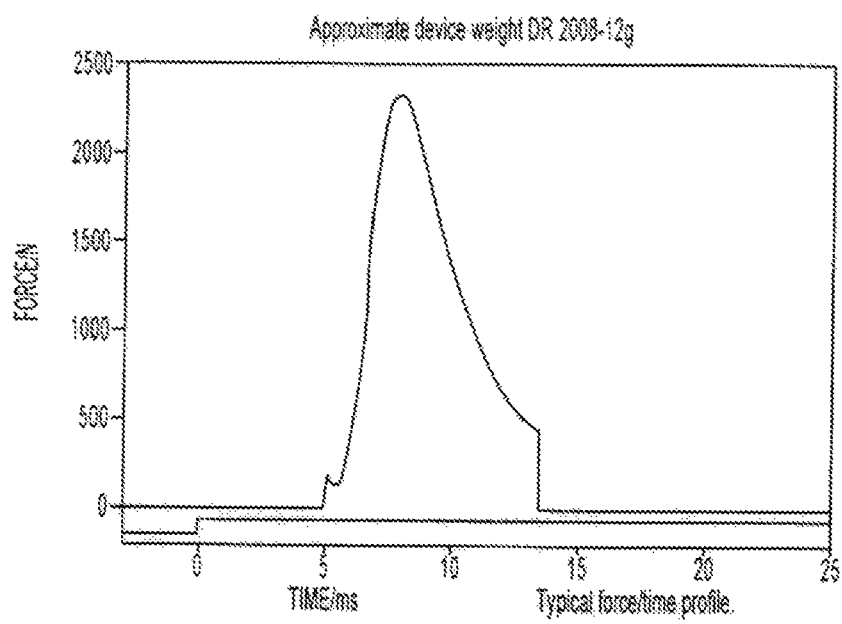
FIG. 6B is a graph illustrating a force/time profile for the preferred embodiment of the electromechanical actuator shown in FIG. 6A.

Referring also to FIGS. 6A and 6B, the actuator apparatus 300 preferably uses a high-speed electromechanical actuator 310. Preferably, the electromechanical actuator 310 includes a protracting actuation device (PAD) that extends or elongates in response to a discharge signal from the ECM 12. The PAD preferably includes a casing 312 and a protracting rod 314 that protracts from the casing 312 in response to receiving via leads (not shown) an electrical signal from the ECM 12. Preferably, the rod 314 protracts approximately 14 millimeters in less than approximately 15 milliseconds and produces a protrusion force of approximately 500 Newtons at the full extent of the protrusion. A block 318 is preferably used for fixing the casing 312 of the PAD with respect to the valve body 140. One example of a suitable PAD is model number DR 2006/C1, manufactured by Nobel Energetics Limited.

The manual override apparatus 400 preferably uses a displacement cam 410. Preferably, the cam 410 is pivotally disposed on the valve body 140 and is coupled by a shaft to a hand actuated lever 430 pivotally disposed on the valve base 120. The shaft preferably includes first and second shaft portions 420a and 420b that are cooperatively engaged in the assembled arrangement of the housing 100. Accordingly, the first shaft portion 420a pivotally supports the cam 410 with respect to the valve body 140 and the second shaft portion 420b pivotally supports the lever 430 with respect to the valve base 120 in a disassembled arrangement (not shown) of the housing 100. Preferably, the manual override apparatus 400 also includes a safety pin 440 to prevent unintended pivoting of the lever 430 with respect to the valve base 120. The safety pin 440 preferably extends though a hole 432 in the lever 430 and into a bore 128 in the valve base 120. Accordingly, a decision to manually operate the valve assembly 90 preferably includes withdrawing the safety pin 440 from the hole 432 and the bore 128 before the lever 430 can be pivoted with respect to the valve base 120. Pivoting the lever 430 causes the shaft 420 to turn the cam 410 in the assembled arrangement of the housing 100. The lever 430 preferably includes a handle 434 configured to be grasped for pivoting the lever 430.

Extending the electromechanical actuator 310 preferably causes a bearing sleeve 320 to move from a latched configuration (FIGS. 7A-7F) to a fired configuration (FIGS. 9A-9F) of the valve 90. Similarly, displacing the cam 410 preferably also causes the bearing sleeve 320 to move from the latched configuration (FIG. 8A and FIG. 8B) to a fired configuration (FIG. 10A and FIG. 10B) of the valve 90.

Figure 7C:
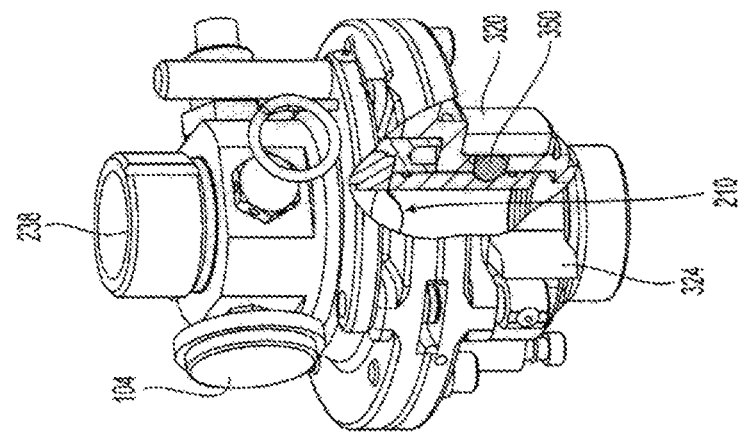
FIGS. 7A-7F illustrate a latched configuration of a preferred embodiment of the valve assembly shown in FIG. 3.
Figure 7B:
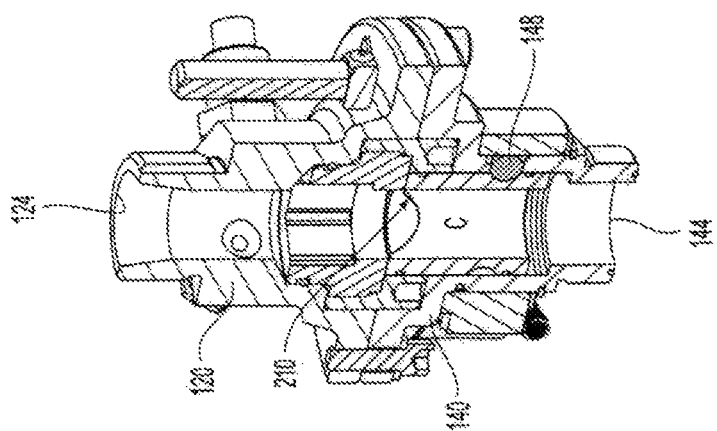
Figure 7A:
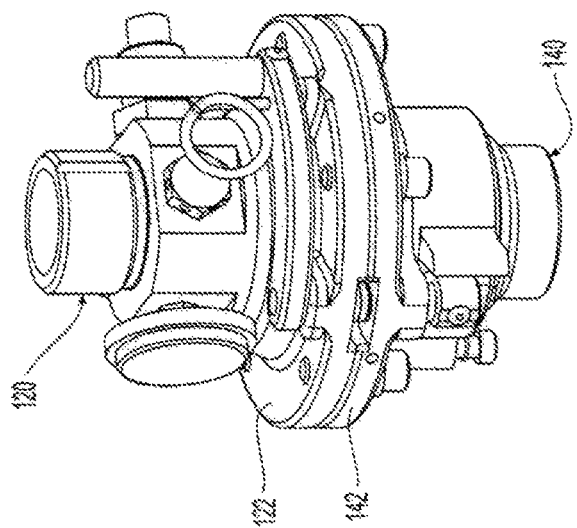
Figure 7F:
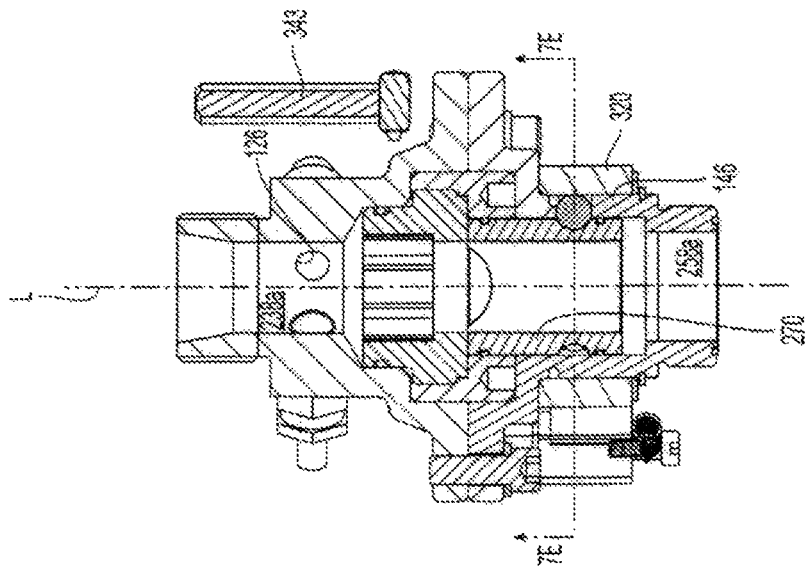
Figure 7E:
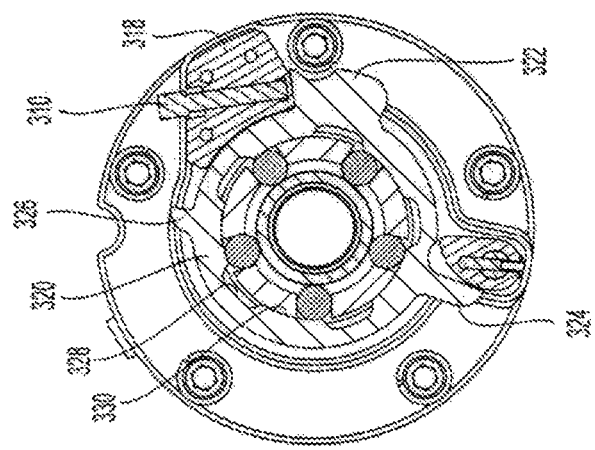
Figure 7D:
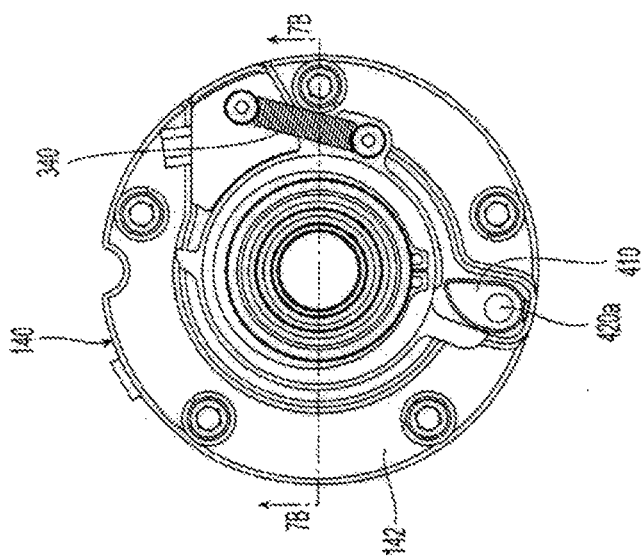
Figure 8A:
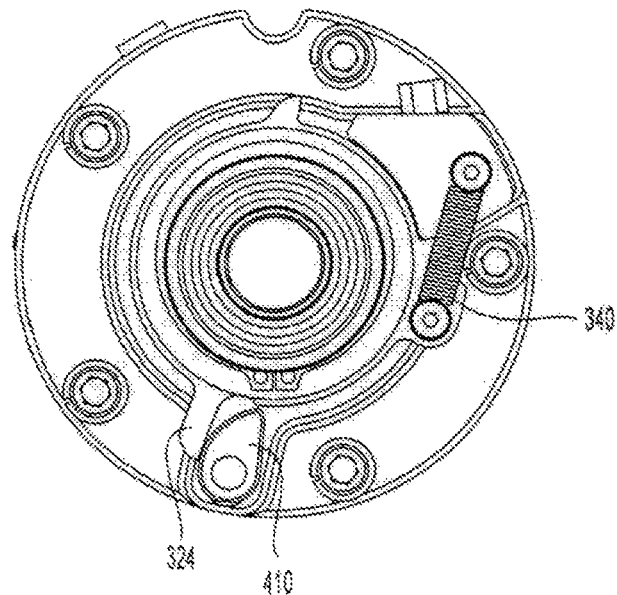
FIGS. 8A and 8B illustrate a preferred embodiment of a manual override apparatus in the latched configuration of the valve assembly shown in FIG. 3.
Figure 8B:
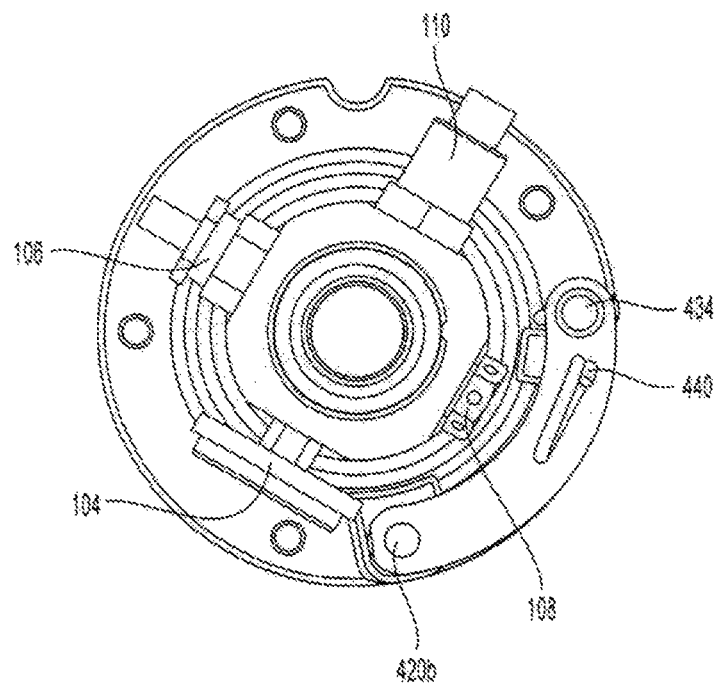
Figure 9C:
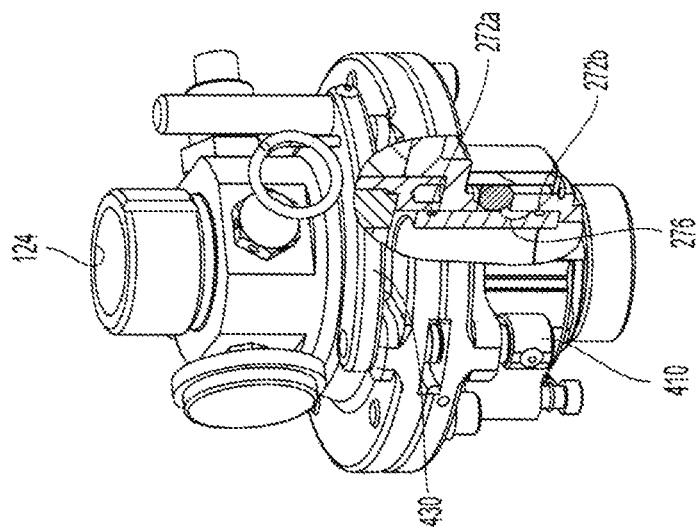
Figure 9B:
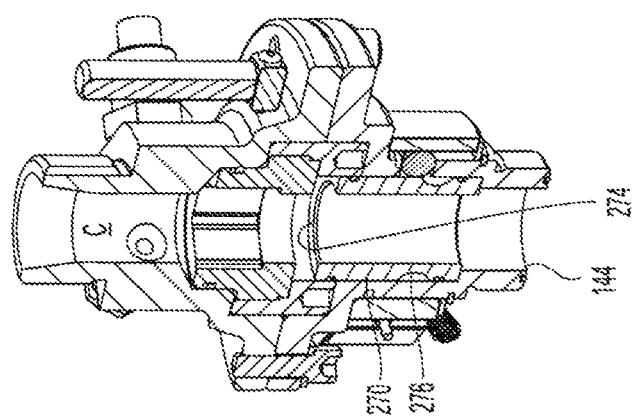
Figure 9A:
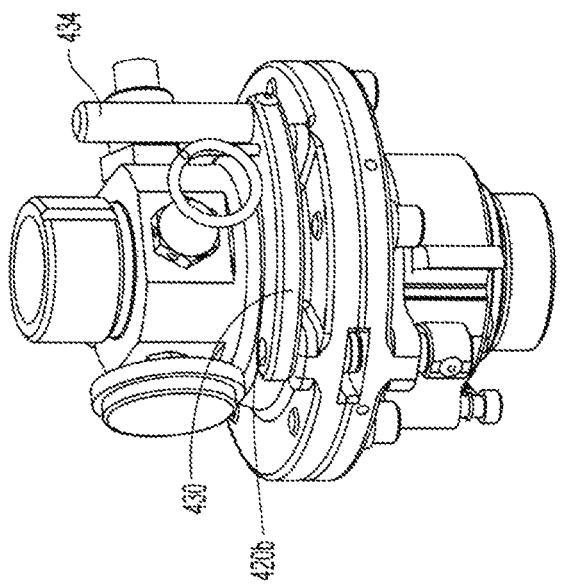
Figure 10A:
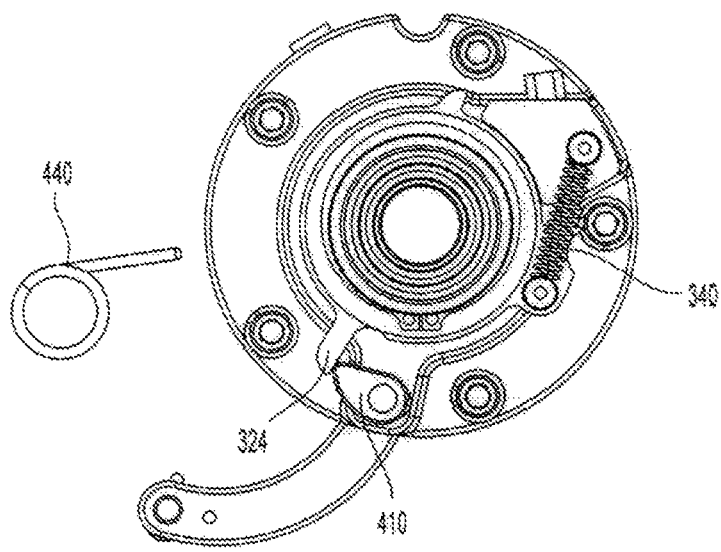
FIGS. 10A and 10B illustrate a preferred embodiment of the manual override apparatus in the fired configuration of the valve assembly shown in FIG. 3.
Figure 10B:
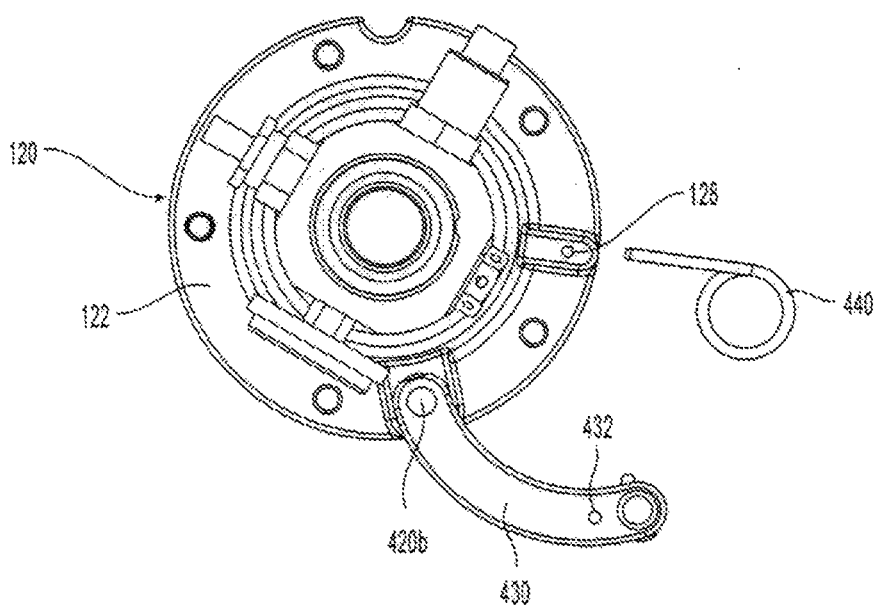

The bearing sleeve 320 preferably moves angularly around the longitudinal axis L. Relative axial movement between the bearing sleeve 320 and a cylindrical portion 146 of the valve body 140 is generally avoided preferably by a washer 150 and/or spring clip 152. The bearing sleeve 320 is generally tubular and has a radially outer surface 320a and a radially inner surface 320b. As best seen in FIG. 7E, there is preferably at least one projection from the radially outer surface 320a. Preferably, the bearing sleeve 320 includes a first projection 322, a second projection 324 and a third projection 326. With particular reference to FIG. 7E, the first projection 322 preferably abuts against the block 318 in the latched configuration of the valve 90 or rests against an actuator tip 314 of the electromechanical actuator 310 in its contracted state. Similarly, the second projection 324 preferably rests against the cam 410 in its unoperated state. The third projection 326 is preferably angularly displaced around the longitudinal axis L apart from the block 318. The radially inner surface 320b preferably confronts the cylindrical portion 146 and includes at least one recess 328 and at least one land 330. Preferably, there are five recesses 328 and five lands 330 disposed in alternating fashion around the circumference of the radially inner surface 320b. As best seen in FIGS. 5A and 7D, an elastic element 340, e.g., a spring, biases the bearing sleeve 320 toward the latched configuration of the valve 90.

The radially inner surface 320b preferably cooperatively engages with at least one latch element 350. Preferably, the at least one latch element 350 includes five balls that contiguously engage corresponding lands 330 in the latched configuration of the valve 90. The latch element(s) 350 are preferably loosely disposed in windows 148 through the cylindrical portion 146 of the valve body 140 and also engage the spool 270 disposed radially inward of the cylindrical portion 146. Preferably, the latch element(s) 350 contiguously engage a circumferential groove 276 of the spool 270 in the latched configuration of the valve 90. The cooperative engagement between the latch element(s) 350 and the groove 276 preferably retains the annular axial face 274 of the spool 270 in the latched configuration of the valve 90; preferably, pressing the radially inner portion of the annulus 214 against the first annular clamp faces 232.

In the fired configuration of the valve 90 shown in FIGS. 9A-10B, the bearing sleeve 300 is preferably moved by the electromechanical actuator 310 acting on the first projection 322 or by the cam 410 acting on the second projection 324. Preferably, the bearing sleeve 300 is angularly displaced around the longitudinal axis L until the third projection 326 approximately engages the block 318. With particular reference to FIG. 9E, this angular displacement causes the radially inner surface 320b to turn around the cylindrical portion 146 of the valve body 140 such that the window(s) 148 align with the recess(es) 328 rather than with the land(s) 330. With the window(s) 148 and the recess(es) 328 aligned, the latch element(s) 350 shift radially outward and disengage from the groove 276. The spool 270 is therefore no longer retained in position by the latch element(s) 350 and axially moves away from the burst disk 210. This axial movement may be in response to the contents of the cylinder expanding, gravity acting on the mass of the spool 270, or a combination of both. Accordingly, the face 274 of the spool 270 separates from the radially inner portion of the annulus 214, thereby exposing the rupture line 216. The combination of exposing the rupture line 216, the different clamping diameters on opposite sides of the burst disk 210, and the pressure differential between the inlet and outlet throats 238 and 258 subjects the burst disk 210 to a set of conditions that ruptures the burst disk 210 and permits the fire extinguishing agent(s) to flow along the longitudinal axis L through the valve 90, including through the spool 270 and out the egress aperture 144.

Figure 11A:
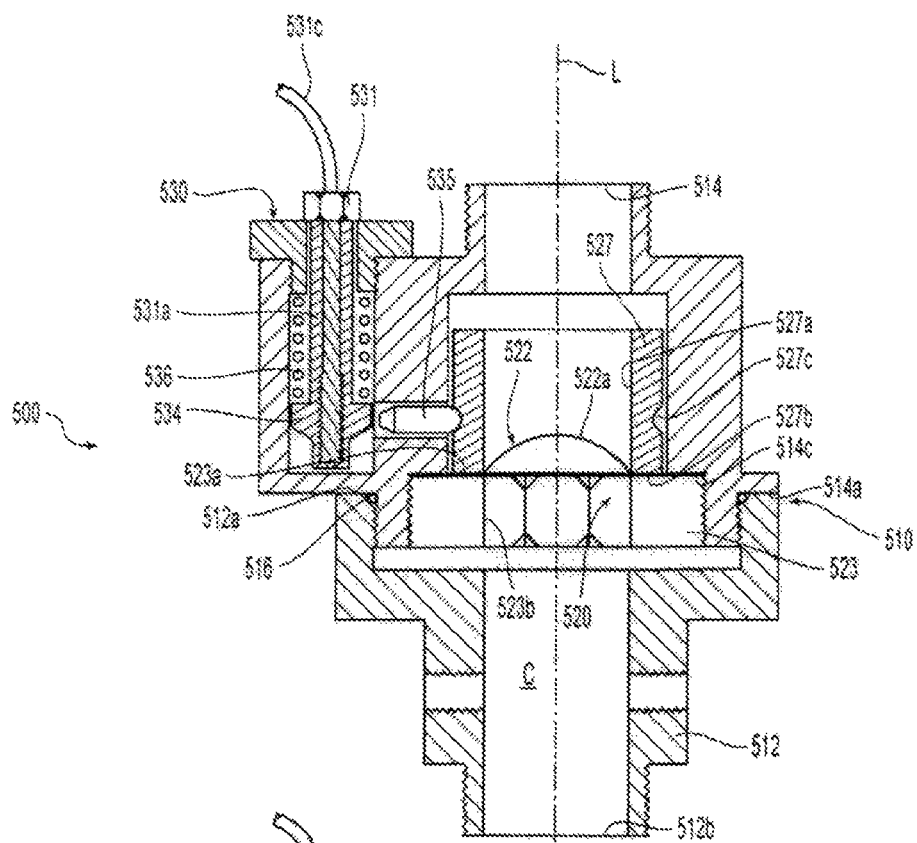
FIGS. 11A and 11B illustrate another preferred embodiment of a valve assembly of the extinguisher assembly shown in FIGS. 2A-2D.
Figure 11B:
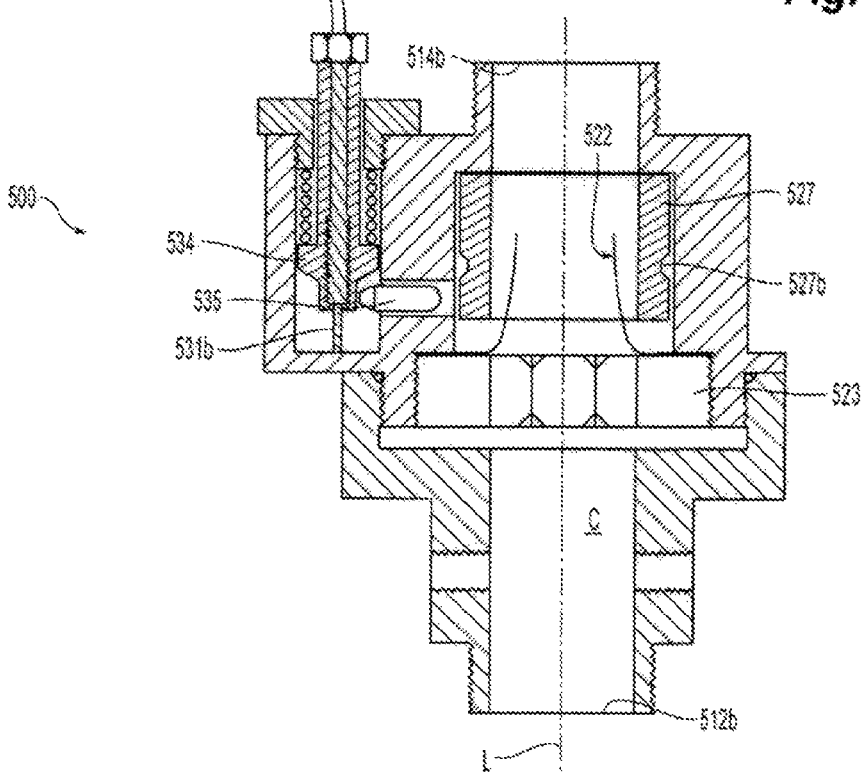

FIGS. 11A and 11B illustrate another preferred embodiment of a valve assembly 500 for discharging the extinguishing agent(s) from a cylinder in response to a signal from the ECM 12. The valve assembly 500 includes a housing 510, a flow control apparatus 520, and an actuator apparatus 530.

The housing 510 preferably includes a valve base 512 and a valve body 514. Preferably, the valve base 512 includes a base flange 512a and the valve body 514 includes a body flange 514a. An assembled arrangement of the housing 510 preferably includes the base flange 512a matingly engaging the body flange 514a. Preferably, screw threads couple the valve base 512 with the valve body 514; however, other connectors may be used to couple the valve base 512 with the valve body 514. A seal 516, e.g., an O-ring, preferably provides a pressure-tight seal between the valve base 512 and the valve body 514.

The valve base 512 includes an ingress aperture 512b and the valve body 514 includes an egress aperture 514b. Fire extinguishing agent(s) from the cylinder pass through the ingress aperture 512b into the valve assembly 500 and subsequently pass through the egress aperture 514b from the valve assembly 500 to be dispersed by a nozzle. In the assembled arrangement of the housing 510, the valve base 512 and the valve body 514 define a cavity C that extends along a longitudinal axis L between the ingress aperture 512b and the egress aperture 514b.

The flow control apparatus 520 is disposed in the cavity C for preventing or permitting flow of the fire extinguishing agent(s) from the ingress aperture 512b to the egress aperture 514b. Flow is prevented in the latched configuration of the valve 500 (See, FIG. 11A.) and is permitted in a fired configuration of the valve 500 (See, FIG. 11B.). The flow control apparatus 520 preferably includes a burst disk 522 that is generally analogous to the burst disk 210 described above. Preferably, a radially outer portion of the burst disk 522 is securely clamped between a first annular clamp face 523a of an inlet ring 523 and a second annular clamp face 514c of the valve body 514.

The inlet ring 523 includes an inside surface 523b that defines a first axial cross-section. The first axial cross-section preferably has a shape that accepts a tool (not shown) to apply torque for rotating the inlet ring 523 relative to the valve body 514. Preferably, the first axial cross-section of the inlet ring 523 includes a hexagonal cross-section.

The flow control apparatus 520 preferably also includes an annular spool 527 that moves along the longitudinal axis L with respect to the burst disk 522. Preferably, the annular spool 527 has an inside surface 527a defining a second cross-section that is approximately sized and shaped so that only a dome 522a of the burst disk 522 is apparent when viewed along the longitudinal axis L looking into the valve body 514 in the latched configuration of the valve 500 (See, FIG. 11A.).

The spool 527 preferably also includes a third annular clamp face 527b that overlies a radially inner portion of the first annular clamp face 523a. The first and third annular clamp faces 523a and 527b move toward or away from one another in response to relative movement of the inlet ring 523 and the annular spool 527 along the longitudinal axis L. The third annular clamp face 527b preferably presses a planar annulus of the burst disk 522 against the radially inner portion of the first annular clamp face 523a in the latched configuration of the valve 500 (See, FIG. 11A.). Accordingly, a rupture line of the burst disk 522 is concealed between the first annular clamp face 523a and the third annular clamp face 527b. The third annular clamp face 527b separates from the planar annulus of the burst disk 522 in the fired configuration of the valve 500 (See, FIG. 11B.). The combination of exposing the rupture line of the burst disk 522 and the pressure differential between the ingress and egress apertures 512b and 514b subjects the burst disk 522 to a set of conditions that ruptures the burst disk 522 and permits the fire extinguishing agent(s) to flow along the longitudinal axis L through the valve 500, including through the annular spool 527.

The actuator apparatus 530 preferably includes a high-speed electromechanical actuator. Preferably, the electromechanical actuator includes a protracting actuation device (PAD) 531 that extends or elongates in response to a discharge signal from the ECM 12. The PAD preferably includes a casing 531a and a protracting rod 531b that protracts from the casing 531a in response to receiving via leads 531c an electrical signal from the ECM 12. The PAD may be generally analogous to the PAD described above with regard to FIGS. 6A and 6B. Preferably, a cam 534 is fixed to move with the casing 531a relative to the valve body 514 in response to protracting the rod 531b. The cam 534 is preferably biased by a resilient element, e.g., a spring 536, to oppose or limit movement of a latch element 535. Preferably, the latch element 535 moves approximately radially with respect to the longitudinal axis L between the latched configuration of the valve 500 (See, FIG. 11A.) and the fired configuration of the valve 500 (See, FIG. 11B.). In the latched configuration, the latch element 535 preferably prevents displacement of the annular spool 527 along the longitudinal axis L away from the inlet ring 523 by contiguously engaging a recess 527c on the spool 527. In the fired configuration, the latch element 535 disengages from the recess 527c on the spool 527 to permit the annular spool 527 to be displaced along the longitudinal axis L away from the inlet ring 523.

Preferably, the latch element 535 is biased away from the spool 527; however, the cam 534 blocks movement of the latch element 535 in the latched configuration. Preferably, pressure from the fire extinguishing agent(s) acting on the burst disk 522 and the cam action of the recess 527c acting on the latch element 535 tends to move the latch element radially outward. Protracting the rod 531b in response to an electrical signal from the ECM 12 causes displacement of the casing 531a and the cam 534. In turn, the cam 534 no longer blocks movement away from the longitudinal axis L by the latch element 535, which disengages from the recess 527c on the spool 527. Accordingly, the spool 527 is displaced along the longitudinal axis L away from the inlet ring 523, thereby revealing the rupture line of the burst disk 522. In a manner generally analogous to the burst disk 210 discussed above, the burst disk 522 ruptures and the fire extinguishing agent(s) are permitted to flow along the longitudinal axis L through the spool 527.

Figure 12A:
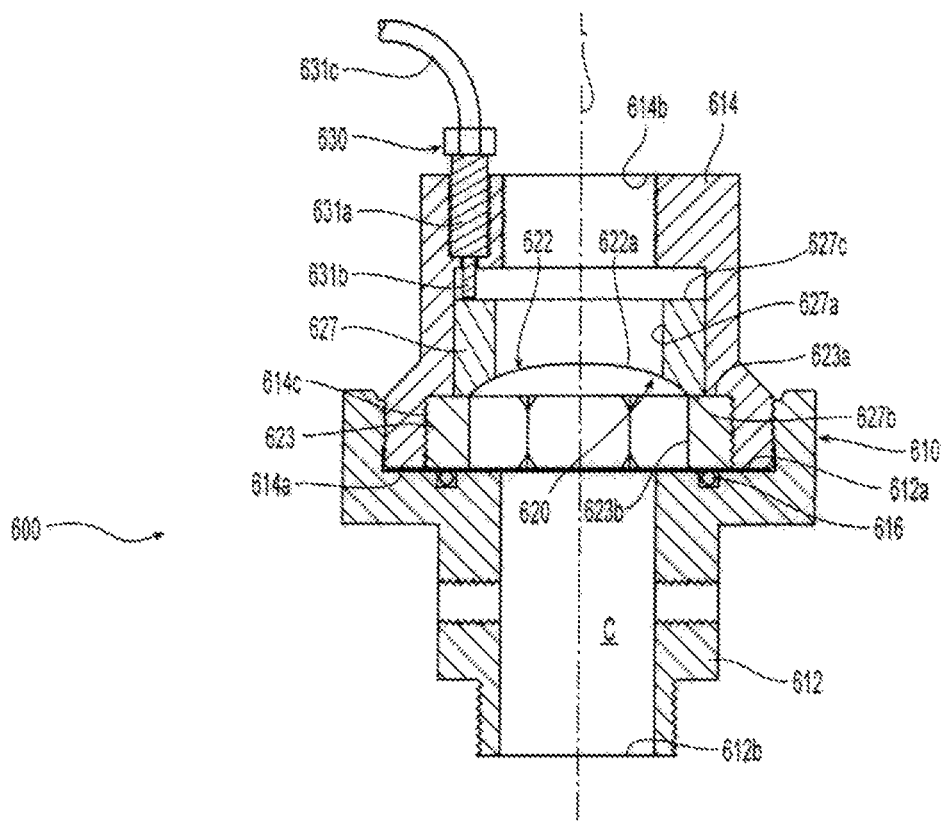
FIGS. 12A and 12B illustrate yet another preferred embodiment of a valve assembly of the extinguisher assembly shown in FIGS. 2A-2D.
Figure 12B:
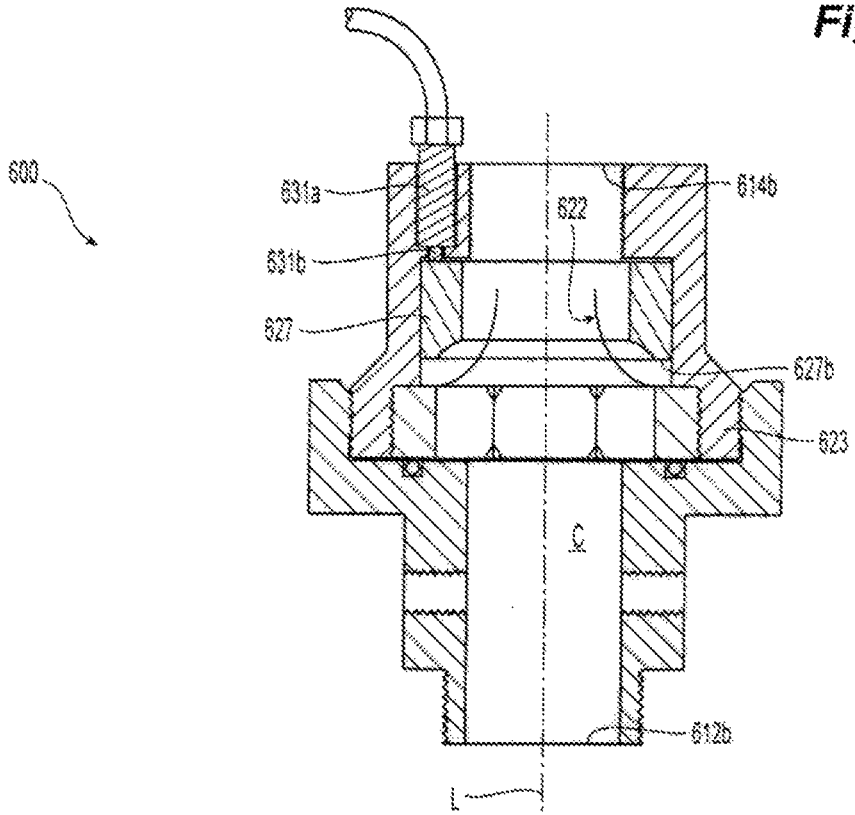

FIGS. 12A and 12B illustrate another preferred embodiment of a valve assembly 600 for discharging the extinguishing agent(s) from a cylinder in response to a signal from the ECM 12. The valve assembly 600 includes a housing 610, a flow control apparatus 620, and an actuator apparatus 630.

The housing 610 preferably includes a valve base 612 and a valve body 614. Preferably, the valve base 612 includes a base flange 612a and the valve body 614 includes a body flange 614a. An assembled arrangement of the housing 610 preferably includes the base flange 612a matingly engaging the body flange 614a. Preferably, screw threads couple the valve base 612 with the valve body 614; however, other connectors may be used to couple the valve base 612 with the valve body 614.

The valve base 612 includes an ingress aperture 612b and the valve body 614 includes an egress aperture 614b. Fire extinguishing agent(s) from the cylinder pass through the ingress aperture 612b into the valve assembly 600 and subsequently pass through the egress aperture 614b from the valve assembly 600 to be dispersed by a nozzle. In the assembled arrangement of the housing 610, the valve base 612 and the valve body 614 define a cavity C that extends along a longitudinal axis L between the ingress aperture 612b and the egress aperture 614b.

The flow control apparatus 620 is disposed in the cavity C for preventing or permitting flow of the fire extinguishing agent(s) from the ingress aperture 612b to the egress aperture 614b. Flow is prevented in the latched configuration of the valve 600 (See, FIG. 12A.) and is permitted in a fired configuration of the valve 600 (See, FIG. 12B.). The flow control apparatus 620 preferably includes a burst disk 622 sandwiched between an inlet ring 623 and the valve body 614. The burst disk 622 may be generally analogous to the burst disk 210 described above. Preferably, a radially outer portion of the burst disk 622 is securely clamped between a first annular clamp face 623a of an inlet ring 623 and a second annular clamp face 614c of the valve body 614.

The inlet ring 623 includes an inside surface 623b that defines a first axial cross-section. The first axial cross-section preferably has a shape that accepts a tool (not shown) to apply torque for rotating the inlet ring 623 relative to the valve body 614. Preferably, the first axial cross-section of the inlet ring 623 includes a hexagonal cross-section. A seal 616, e.g., an O-ring, preferably provides a pressure-tight seal between the valve base 612 and the inlet ring 623, and therefore between the valve base 612 and the valve body 614.

The flow control apparatus 620 preferably also includes an annular spool 627 that moves along the longitudinal axis L with respect to the burst disk 622. Preferably, the annular spool 627 has an inside surface 627a defining a second cross-section that is approximately sized and shaped so that only a portion of a dome 622a of the burst disk 622 is apparent when viewed along the longitudinal axis L looking into the valve body 614 in the latched configuration of the valve 600 (See, FIG. 12A.). The inside surface 627a preferably includes a contoured portion that approximately mimics a portion of a dome 622a of the burst disk 622 in the latched configuration of the valve 600 (See, FIG. 12A.).

The spool 627 preferably also includes a third annular clamp face 627b that overlies a radially inner portion of the first annular clamp face 623a. The first and third annular clamp faces 623a and 627b move toward or away from one another in response to relative movement of the inlet ring 623 and the annular spool 627 along the longitudinal axis L. The third annular clamp face 627b preferably presses a planar annulus of the burst disk 622 against the radially inner portion of the first annular clamp face 623a in the latched configuration of the valve 600 (See, FIG. 12A.). Accordingly, a rupture line of the burst disk 622 is concealed between the first annular clamp face 623a and the third annular clamp face 627b. The third annular clamp face 627b separates from the planar annulus of the burst disk 622 in the fired configuration of the valve 600 (See, FIG. 12B.). The combination of exposing the rupture line of the burst disk 622 and the pressure differential between the ingress and egress apertures 612b and 614b subjects the burst disk 622 to a set of conditions that ruptures the burst disk 622 and permits the fire extinguishing agent(s) to flow along the longitudinal axis L through the valve 600, including through the annular spool 627.

The actuator apparatus 630 preferably uses a high-speed electromechanical actuator. Preferably, the electromechanical actuator includes a protracting actuation device (PAD) that retracts or contracts in response to a discharge signal from the ECM 12. The PAD preferably includes a casing 631a and a protracting rod 631b that is nominally extended and retracts into the casing 631a in response to receiving via leads 631c an electrical signal from the ECM 12. In the latched configuration of the valve 600 (See, FIG. 12A.), the protracting rod 631b prevents displacement of the annular spool 627 along the longitudinal axis L away from the inlet ring 623. Preferably, the protracting rod 631b extends approximately parallel to the longitudinal axis L and a tip of the protracting rod 631b contiguously engages a second annular axial face 627c on the spool 627. Preferably, the second annular axial face 627b is at an opposite axial end from the first annular axial face 627a. In the fired configuration, the protracting rod 631b retracts into the casing 631a thereby permitting the annular spool 627 to be displaced along the longitudinal axis L away from the inlet ring 623.

Figure 13A:
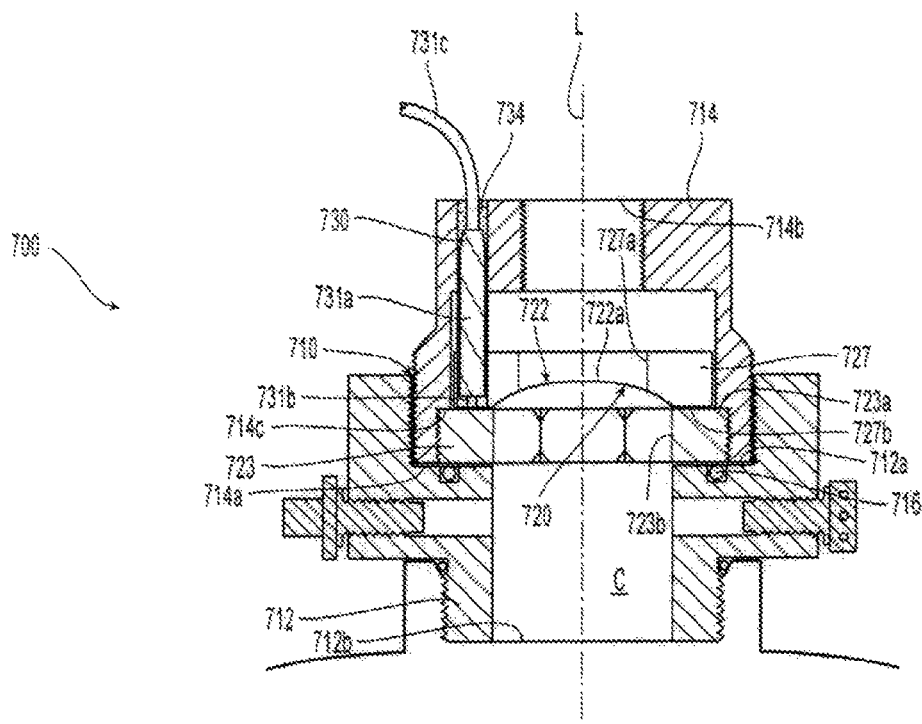
FIGS. 13A and 13B illustrate a further preferred embodiment of a valve assembly of the extinguisher assembly shown in FIGS. 2A-2D.
Figure 13B:
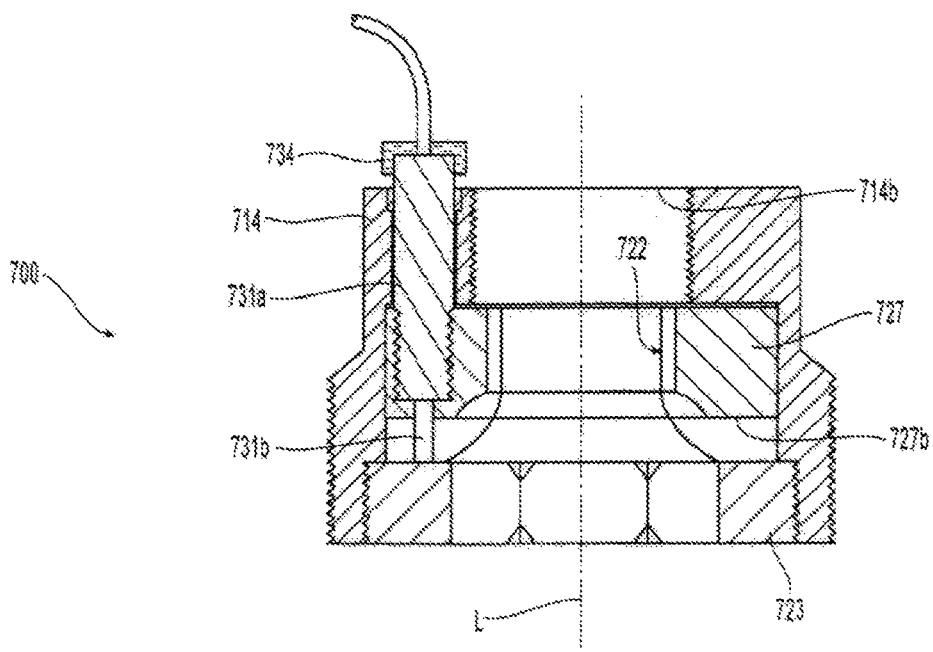

FIGS. 13A and 13B illustrate another preferred embodiment of a valve assembly 700 for discharging the extinguishing agent(s) from a cylinder in response to a signal from the ECM 12. The valve assembly 700 includes a housing 710, a flow control apparatus 720, and an actuator apparatus 730.

The housing 710 preferably includes a valve base 712 and a valve body 714. Preferably, the valve base 712 includes a base flange 712a and the valve body 714 includes a body flange 714a. An assembled arrangement of the housing 710 preferably includes the base flange 712a matingly engaging the body flange 714b. Preferably, screw threads couple the valve base 712 with the valve body 714; however, other connectors may be used to couple the valve base 712 with the valve body 714.

The valve base 712 includes an ingress aperture 712b and the valve body 714 includes an egress aperture 714b. Fire extinguishing agent(s) from the cylinder pass through the ingress aperture 712b into the valve assembly 700 and subsequently pass through the egress aperture 714b from the valve assembly 700 to be dispersed by a nozzle. In the assembled arrangement of the housing 710, the valve base 712 and the valve body 714 define a cavity C that extends along a longitudinal axis L between the ingress aperture 712b and the egress aperture 714b.

The flow control apparatus 720 is disposed in the cavity C for preventing or permitting flow of the fire extinguishing agent(s) from the ingress aperture 712b to the egress aperture 714b. Flow is prevented in the latched configuration of the valve 700 (See, FIG. 13A.) and is permitted in a fired configuration of the valve 700 (See, FIG. 13B.). The flow control apparatus 720 preferably includes a burst disk 722 retained between an inlet ring 723 and the valve body 714. The burst disk 722 may be generally analogous to the burst disk 210 described above. Preferably, a radially outer portion of the burst disk 722 is securely clamped between a first annular clamp face 723a of the inlet ring 723 and a second annular clamp face 714c of the valve body 714.

The inlet ring 723 includes an inside surface 723b that defines a first axial cross-section. The first axial cross-section preferably has a shape that accepts a tool (not shown) to apply torque for rotating the inlet ring 723 relative to the valve body 714. Preferably, the first axial cross-section of the inlet ring 723 includes a hexagonal cross-section. A seal 716, e.g., an O-ring, preferably provides a pressure-tight seal between the valve base 712 and the inlet ring 723, and therefore between the valve base 712 and the valve body 714.

The flow control apparatus 720 preferably also includes an annular spool 727 that moves along the longitudinal axis L with respect to the burst disk 722. Preferably, the annular spool 727 has an inside surface 727a defining a second cross-section that is approximately sized and shaped so that only a portion of a dome 722a of the burst disk 722 is apparent when viewed along the longitudinal axis L looking into the valve body 714 in the latched configuration of the valve 700 (See, FIG. 13A.). The inside surface 727a preferably includes a contoured portion that approximately mimics a portion of a dome 722a of the burst disk 722 in the latched configuration of the valve 700 (See, FIG. 13A.).

The spool 727 preferably also includes a third annular clamp face 727b that overlies a radially inner portion of the first annular clamp face 723a. The first and third annular clamp faces 723a and 727b move toward or away from one another in response to relative movement of the inlet ring 723 and the annular spool 727 along the longitudinal axis L. The third annular clamp face 727b preferably presses a planar annulus of the burst disk 722 against the radially inner portion of the first annular clamp face 723a in the latched configuration of the valve 700 (See, FIG. 13A.). Accordingly, a rupture line of the burst disk 722 is concealed between the first annular clamp face 723a and the third annular clamp face 727b. The third annular clamp face 727b separates from the planar annulus of the burst disk 722 in the fired configuration of the valve 700 (See, FIG. 13B.). The combination of exposing the rupture line of the burst disk 722 and the pressure differential between the ingress and egress apertures 712b and 714b subjects the burst disk 722 to a set of conditions that ruptures the burst disk 722 and permits the fire extinguishing agent(s) to flow along the longitudinal axis L through the valve 700, including through the annular spool 727.

The actuator apparatus 730 preferably uses a high-speed electromechanical actuator. Preferably, the electromechanical actuator includes a protracting actuation device (PAD) that extends or elongates in response to a discharge signal from the ECM 12. The PAD preferably includes a casing 731a and a protracting rod 731b that is nominally retracted and extends from the casing 731a in response to receiving via leads 731c an electrical signal from the ECM 12. Preferably, the annular spool 727 is fixed for movement with the casing 731a relative to the valve body 714. In the latched configuration of the valve 700 (See, FIG. 13A.), a plug 734 is preferably disposed between the casing 731a and valve body 714. Preferably, the plug 734 includes a frangible material, e.g., epoxy, that prevents or interferes with relative movement between the casing 731a and valve body 714 at least until the ECM 12 sends an electrical signal to the PAD. The protracting rod 731b contiguously engages the planar annulus of the burst disk 722 and displacement of the annular spool 727 along the longitudinal axis L away from the inlet ring 723 in the latched configuration of the valve 700 (See, FIG. 13A.) is preferably prevented by the casing 731a being fixed to the annular spool 727 and the casing 731a being fixed to the valve body 714 by the plug 734. In the fired configuration of the valve 700 (See, FIG. 13B.), the protracting rod 731b extends from the casing 731a thereby breaking, dislodging, or otherwise separating the plug 734 with respect to the casing 731a and/or the valve body 714 while displacing the annular spool 727 along the longitudinal axis L away from the inlet ring 723. Preferably, the composition and/or arrangement of the plug 734 in the latched configuration of the valve 700 (See, FIG. 13A.) provides a resistive force that is sufficient to oppose relative displacement between the casing 731a and valve body 714 in the latched configuration of the valve 700 (See, FIG. 13A.) but is insufficient to oppose extending the protracting rod 731b from the casing 731a in response to receiving via leads 731c an electrical signal from the ECM 12.

FIGS. 14A and 14B illustrate another preferred embodiment of a valve assembly 800 for discharging the extinguishing agent(s) from a cylinder in response to a signal from the ECM 12. The valve assembly 800 includes a housing 810, a flow control apparatus 820, and an actuator apparatus 830.

The housing 810 preferably includes a valve base 812 and a valve body 814. Preferably, the valve base 812 includes a base flange 812a and the valve body 814 includes a body flange 814a. An assembled arrangement of the housing 810 preferably includes the base flange 812a matingly engaging the body flange 814a. Preferably, screw threads couple the valve base 812 with the valve body 814; however, other connectors may be used to couple the valve base 812 with the valve body 814.

The valve base 812 includes an ingress aperture 812b and the valve body 814 includes an egress aperture 814b. Fire extinguishing agent(s) from the cylinder pass through the ingress aperture 812b into the valve assembly 800 and subsequently pass through the egress aperture 814b from the valve assembly 800 to be dispersed by a nozzle. In the assembled arrangement of the housing 810, the valve base 812 and the valve body 814 define a cavity C that extends along a longitudinal axis L between the ingress aperture 812b and the egress aperture 814b.

The flow control apparatus 820 is disposed in the cavity C for preventing or permitting flow of the fire extinguishing agent(s) from the ingress aperture 812b to the egress aperture 814b. Flow is prevented in the latched configuration of the valve 800 (See, FIG. 14A.) and is permitted in a fired configuration of the valve 800 (See, FIG. 14B.). The flow control apparatus 820 preferably includes a burst disk 822 sandwiched between an inlet ring 823 and the valve body 814. The burst disk 822 may be generally analogous to the burst disk 210 described above. Preferably, a radially outer portion of the burst disk 822 is securely clamped between a first annular clamp face 823a of an inlet ring 823 and a second annular clamp face 814c of the valve body 814.

The inlet ring 823 includes an inside surface 823b that defines a first axial cross-section. The first axial cross-section preferably has a shape that accepts a tool (not shown) to apply torque for rotating the inlet ring 823 relative to the valve body 814. Preferably, the first axial cross-section of the inlet ring 823 includes a hexagonal cross-section. A seal 816, e.g., an O-ring, preferably provides a pressure-tight seal between the valve base 812 and the inlet ring 823, and therefore between the valve base 812 and the valve body 814.

The flow control apparatus 820 preferably also includes an annular seat 827 that tilts about a pivot pin 814d. Preferably, the annular seat 827 has an inside surface 827a defining a second cross-section that is approximately sized and shaped so that only a portion of a dome 822a of the burst disk 822 is apparent when viewed along the longitudinal axis L looking into the valve body 814 in the latched configuration of the valve 800 (See, FIG. 14A.). The inside surface 827a preferably includes a contoured portion that approximately mimics a portion of a dome 822a of the burst disk 822 in the latched configuration of the valve 800 (See, FIG. 14A.).

The annular seat 827 preferably also includes a third annular clamp face 827b that overlies a radially inner portion of the first annular clamp face 823a. The first and third annular clamp faces 823a and 827b separate from one another in response to tilting movement of the annular seat 827 about the pivot pin 814d. The third annular clamp face 827b preferably presses a planar annulus of the burst disk 822 against the radially inner portion of the first annular clamp face 823a in the latched configuration of the valve 800 (See, FIG. 14A.). A rupture line of the burst disk 822 is concealed because it is disposed radially outward of where the third annular clamp face 827b presses against the planar annulus of the burst disk 822. Accordingly, when the third annular clamp face 827b separates from the planar annulus of the burst disk 822 in the fired configuration of the valve 800 (See, FIG. 14B.), the rupture line of the burst disk 822 is no longer concealed by the third annular clamp face 827b and the burst disk 822 ruptures. The combination of exposing the rupture line of the burst disk 822 and the pressure differential between the ingress and egress apertures 812b and 814b subjects the burst disk 822 to a set of conditions that ruptures the burst disk 822 and permits the fire extinguishing agent(s) to flow along the longitudinal axis L through the valve 800, including through the annular spool 827.

The actuator apparatus 830 preferably uses a high-speed electromechanical actuator. Preferably, the electromechanical actuator includes a protracting actuation device (PAD) that retracts or contracts in response to a discharge signal from the ECM 12. The PAD preferably includes a casing 831a and a protracting rod 831b that is nominally extended and retracts into the casing 831a in response to receiving via leads 831c an electrical signal from the ECM 12. In the latched configuration of the valve 800 (See, FIG. 14A.), the protracting rod 831b prevents tilting of the annular seat 827 away from the inlet ring 823. Preferably, the protracting rod 831b extends approximately parallel to the longitudinal axis L and a tip of the protracting rod 831b contiguously engages the annular seat 827 opposite the third annular clamp face 827b. In the fired configuration, the protracting rod 831b retracts into the casing 831a thereby permitting the annular seat 827 to tilt about the pivot pin 814d away from the inlet ring 823.

FIGS. 15A-15C illustrate again another preferred embodiment of a valve assembly 900 for discharging the extinguishing agent(s) from a cylinder in response to a signal from the ECM 12. The valve assembly 900 includes a disposable housing 910, a flow control apparatus 920, and an actuator apparatus 930.

FIG. 15B shows details of the disposable housing 910. Preferably, the disposable housing 910 defines a cavity C that extends along a longitudinal axis L between an ingress aperture 912 and an egress aperture 914. Fire extinguishing agent(s) from the cylinder pass through the ingress aperture 912 into the valve assembly 900 and subsequently pass through the egress aperture 914 to be dispersed by a nozzle N. Preferably, screw threads couple the disposable housing 910 with the nozzle N; however, other connectors may be used to couple the disposable housing 910 with the nozzle N.

The disposable housing 910 preferably includes an annular shelf 916 disposed in the cavity C. The disposable housing 910 also preferably includes at least one, and preferably a plurality, of a radial aperture(s) (two radial apertures 918a and 918b are shown in FIG. 15B). Individual radial apertures 918 are preferably disposed equiangularly around the longitudinal axis L.

The flow control apparatus 920 is disposed in the cavity C for preventing or permitting flow of the fire extinguishing agent(s) from the ingress aperture 912 to the egress aperture 914. Flow is prevented in a latched configuration of the valve 900 (See, FIG. 15A.) and is permitted in a fired configuration of the valve 900 (See, FIG. 15C.). The flow control apparatus 920 preferably includes a burst disk 922 that is welded to the annular shelf 916. Certain embodiments according to the present disclosure may use the same weld for securing the burst disk 922 also for fixing together a multiple piece disposable housing (not shown). Preferably, the burst disk 922 is also sandwiched between the annular shelf 916 and an outlet ring 925. The burst disk 922 may be generally analogous to the burst disk 210 described above. The outlet ring 925 preferably also includes an annular clamp face 925a that overlies the annular shelf 916. The annular clamp face 925a moves relative to the annular shelf 916 in response to movement of the outlet ring 925 along the longitudinal axis L. The annular clamp face 925a preferably presses a planar annulus of the burst disk 922 against the annular shelf 916 in the latched configuration of the valve 900 (See, FIG. 15A.). Accordingly, a rupture line of the burst disk 922 is concealed between the annular clamp face 925a and the annular shelf 916. The annular clamp face 925a separates from the planar annulus of the burst disk 922 in the fired configuration of the valve 900 (See, FIG. 15C.). Accordingly, the rupture line of the burst disk 922 is revealed such that the burst disk 922 ruptures and permits the fire extinguishing agent(s) to flow along the longitudinal axis L. Preferably, the discharge of the fire extinguishing agent(s) is through the outlet ring 925.

Preferably, a recess 925b is disposed around the outside of the outlet ring 925. The actuator apparatus 930 preferably also includes individual latch element loosely disposed in each of the radial aperture(s) 918. FIG. 15A shows two latch elements 932a and 932b contiguously engaging the recess 925b of the outlet ring 925 to retain the outlet ring 925 in the latched configuration of the valve 900 (See, FIG. 15A.). Outward radial displacement of the latch elements 932a and 932b is preferably blocked by a sleeve 934 disposed around the disposable housing 910 and cincturing the radial apertures 918a and 918b. A resilient element 936, preferably a coil spring, is disposed around the disposable housing 910 and biases the sleeve 934 toward the latched configuration of the valve 900 (See, FIG. 15A.).

In the fired configuration of the valve 900 (See, FIG. 15C.), the sleeve 934 is preferably moved along the longitudinal axis L, against the bias of the resilient element 936. Preferably, movement of the sleeve 934 permits the latch element(s) 932 to move radially outward in the radial aperture(s) 918, thereby releasing the sleeve 934 to move to the fired configuration of the valve 900 (See, FIG. 15C.). The combination of exposing the rupture line of the burst disk 922 and the pressure differential between the ingress and egress apertures 912 and 914 subjects the burst disk 922 to a set of conditions that ruptures the burst disk 922 and permits the fire extinguishing agent(s) to flow along the longitudinal axis L through the valve 900, including through the outlet ring 925, to the nozzle N.

The actuator apparatus 930 preferably includes a high-speed electromechanical actuator. Preferably, the electromechanical actuator includes a protracting actuation device (PAD) 938 that extends or elongates in response to a discharge signal from the ECM 12. The PAD preferably includes a casing 938a and a protracting rod 938b that protracts from the casing 938a in response to receiving via leads 938c an electrical signal from the ECM 12. The PAD 938 may be generally analogous to the PAD described above with regard to FIGS. 6A and 6B. Preferably, sleeve 934 moves relative to the disposable housing 910 in response to protracting the rod 931b. Preferably, the latch elements 932a and 932b move approximately radially with respect to the longitudinal axis L between the latched configuration of the valve 900 (See, FIG. 15A.) and the fired configuration of the valve 900 (See, FIG. 15C.). In the latched configuration, the latch elements 932a and 932b preferably prevent displacement of the outlet ring 925 along the longitudinal axis L away from the annular shelf 916 by contiguously engaging the recess 925b on the outlet ring 925. In the fired configuration, the latch elements 932a and 932b disengage from the recess 925b to permit the outlet ring 925 to be displaced along the longitudinal axis L away from the annular shelf 916.

Preferably, the latch element(s) 932 are biased away from the outlet ring 925; however, the sleeve 934 blocks movement of the latch elements 932a and 932b in the latched configuration. Preferably, pressure from the fire extinguishing agent(s) acting on the burst disk 922 and the cam action of the recess 925b acting on the latch elements 932a and 932b tends to move the latch elements 932a and 932b radially outward. Protracting the rod 938b in response to an electrical signal from the ECM 12 causes displacement of the sleeve 934 relative to the annular shelf 916. In turn, the sleeve 934 no longer blocks movement away from the longitudinal axis L by the latch elements 932a and 932b, which disengage from the recess 925b on the outlet ring 925. Accordingly, the outlet ring 925 is displaced along the longitudinal axis L away from the annular shelf 916, thereby revealing the rupture line of the burst disk 922. In a manner generally analogous to the burst disk 210 discussed above, the burst disk 922 ruptures and the fire extinguishing agent(s) are permitted to flow along the longitudinal axis L through the outlet ring 925.

FIGS. 16A-16D illustrate yet again another preferred embodiment of a valve assembly 1000 for discharging the extinguishing agent(s) from a cylinder in response to a signal from the ECM 12. The valve assembly 1000 includes a housing, a flow control apparatus 1020, and an actuator apparatus 1030.

The housing preferably includes a valve base 1012 and a valve body 1014. Preferably, the valve base 1012 includes a base flange 1012a and the valve body 1014 includes a body flange 1014a. An assembled arrangement of the housing 1010 preferably includes the base flange 1012a matingly engaging the body flange 1014a. Preferably, screw threads couple the valve base 1012 with the valve body 1014; however, other connectors may be used to couple the valve base 1012 with the valve body 1014.

The valve base 1012 includes an ingress aperture 1012b and the valve body 1014 includes an egress aperture 1014b. Fire extinguishing agent(s) from the cylinder pass through the ingress aperture 1012b into the valve assembly 1000 and subsequently pass through the egress aperture 1014b from the valve assembly 1000 to be dispersed by a nozzle. In the assembled arrangement of the housing 1010, the valve base 1012 and the valve body 1014 define a cavity C that extends along a longitudinal axis L between the ingress aperture 1012b and the egress aperture 1014b.

The flow control apparatus 1020 is disposed in the cavity C for preventing or permitting flow of the fire extinguishing agent(s) from the ingress aperture 1012b to the egress aperture 1014b. Flow is prevented in the latched configuration of the valve 1000 (See, FIG. 16A.) and is permitted in a fired configuration of the valve 1000 (See, FIG. 16D.). The flow control apparatus 1020 preferably includes a burst disk 1022 retained between an inlet ring 1023 and the valve body 1014. The burst disk 1022 may be generally analogous to the burst disk 210 described above. Preferably, a radially outer portion of the burst disk 1022 is securely clamped between a first annular clamp face 1023a of the inlet ring 1023 and a second annular clamp face of the valve body 1014.

The inlet ring 1023 includes an inside surface 1023b that defines a first axial cross-section. The first axial cross-section preferably has a shape that accepts a tool (not shown) to apply torque for rotating the inlet ring 1023 relative to the valve body 1014. Preferably, the first axial cross-section of the inlet ring 1023 includes a hexagonal cross-section. A seal 1016, e.g., an O-ring, preferably provides a pressure-tight seal between the valve base 1012 and the inlet ring 1023, and therefore between the valve base 1012 and the valve body 1014.

The flow control apparatus 1020 preferably also includes an annular spool 1027 that moves along the longitudinal axis L with respect to the burst disk 1022. Preferably, the annular spool 1027 has an inside surface 1027a defining a second cross-section that is approximately sized and shaped so that only a portion of a dome 1022a of the burst disk 1022 is apparent when viewed along the longitudinal axis L looking into the valve body 1014 in the latched configuration of the valve 1000 (See, FIG. 16A.). The inside surface 1027a preferably includes a contoured portion that approximately mimics a portion of a dome 1022a of the burst disk 1022 in the latched configuration of the valve 1000 (See, FIG. 16D.).

The spool 1027 preferably also includes a third annular clamp face 1027b that overlies a radially inner portion of the first annular clamp face 1023a. The first and third annular clamp faces 1023a and 1027b move toward or away from one another in response to relative movement of the inlet ring 1023 and the annular spool 1027 along the longitudinal axis L. The third annular clamp face 1027b preferably presses a planar annulus of the burst disk 1022 against the radially inner portion of the first annular clamp face 1023a in the latched configuration of the valve 1000 (See, FIG. 16A.). Accordingly, a rupture line of the burst disk 1022 is concealed between the first annular clamp face 1023a and the third annular clamp face 1027b. The third annular clamp face 1027b separates from the planar annulus of the burst disk 1022 in the fired configuration of the valve 1000 (See, FIG. 16D.). The combination of exposing the rupture line of the burst disk 1022 and the pressure differential between the ingress and egress apertures 1012b and 1014b subjects the burst disk 1022 to a set of conditions that ruptures the burst disk 1022 and permits the fire extinguishing agent(s) to flow along the longitudinal axis L through the valve 1000, including through the annular spool 1027.

The actuator apparatus 1030 preferably uses a high-speed electromechanical actuator. Preferably, the electromechanical actuator includes a protracting actuation device (PAD) that extends or elongates in response to a discharge signal from the ECM 12. The PAD preferably includes a casing 1031a and a protracting rod 1031b that is nominally retracted and extends from the casing 1031a in response to receiving via leads 1031c an electrical signal from the ECM 12. The PAD is preferably disposed such that the protracting rod 1031b is oriented to extend into a groove 1014c disposed in the valve body 1014. Preferably, the groove 1014c is an arc that is formed in an interior wall 1014d of the valve body 1014 and extends around only a portion of the longitudinal axis L. The groove 1014c receives an internal circlip 1032 in the latched configuration of the valve 1000 (See, FIGS. 16A and 16B.). The circlip 1032 contiguously engages a second annular axial face 1027c of the annular spool 1027 and accordingly prevents movement of the axial spool 1027 along the longitudinal axis L away from the inlet ring 1023 in the latched configuration of the valve 1000. Preferably, the second annular axial face 1027c is at an opposite axial end from the first annular axial face 1027b.

Referring to FIGS. 16C and 16D, the protracting rod 1031b extends into the groove 1014c in response to the PAD receiving a discharge signal from the ECM 12. This displaces the circlip 1032 from the groove 1014c thereby releasing the annular spool 1027 to move to the fired configuration of the valve 1000 (See, FIG. 16D.). The combination of exposing the rupture line of the burst disk 1022 and the pressure differential between the ingress and egress apertures 1012 and 1014 subjects the burst disk 1022 to a set of conditions that ruptures the burst disk 1022 and permits the fire extinguishing agent(s) to flow along the longitudinal axis L through the valve 1000, including through the annular spool 1027.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A valve for a fire extinguishing system dispensing a fire extinguishing agent, the valve comprising:
   a housing including an ingress aperture and an egress aperture, the housing defines a cavity extending along a longitudinal axis between the ingress aperture and the egress aperture;
   a flow control apparatus disposed in the cavity to prevent or permit flow of the fire extinguishing agent from the ingress aperture to the egress aperture, the flow control apparatus includes—
      a rupturable disk having opposite first and second sides;
      an inlet ring including a first annular face contiguously engaging the first side of the rupturable disk; and
      an outlet ring including a second annular face contiguously engaging a radially outer portion of the second side of the rupturable disk, wherein at least a radially outer portion of the rupturable disk is clamped between the first and second annular faces;
   an annular spool defining a cylindrical body axially movable inside the housing along the longitudinal axis;
   an actuator apparatus including an electromechanical actuator, a bearing sleeve angularly movable outside of the housing around the longitudinal axis, and a latch element operably coupling the bearing sleeve and the annular spool; and
   a manual override apparatus including a lever pivotally disposed on the housing and a cam operably coupled to the lever and the bearing sleeve.

2. The valve according to claim 1 wherein the housing comprises a valve base secured to a valve body, the valve base includes the ingress aperture and the valve body includes the egress aperture.

3. The valve according to claim 2 wherein the valve base at least partially defines an inlet throat, the valve body at least partially defines an outlet throat, and the flow control apparatus prevents or permits extinguishing agent flow from the inlet throat to the outlet throat.

4. The valve according to claim 3, further comprising at least one of a pressure gauge, a fill valve, a pressure sensor, and an over-pressure relief device in fluid communication with the inlet throat.

5. The valve according to claim 1 wherein the rupturable disk comprises at least one rupture line.

6. The valve according to claim 5 wherein the rupture line extends about a majority of the rupturable disk and a hinge is defined between ends of the rupture line.

7. The valve according to claim 1 wherein the inlet ring comprises a male threads, the outlet ring includes female threads, and the male and female threads are relatively rotatable to clamp the rupturable disk between the first and second annular faces.

8. The valve according to claim 1 wherein the first inlet ring includes a first inside diameter and the outlet ring includes a second inside diameter larger than the first inside diameter.

9. The valve according to claim 1 wherein the latch element extends through an opening in the housing and contiguously engages the bearing sleeve and the annular spool in a latched configuration of the valve.

10. The valve according to claim 1 wherein the bearing sleeve comprises a radially outer surface and a radially inner surface, the radially outer surface includes at least one projection operably coupled to at least one of the electromechanical actuator and the cam, and the radially inner surface includes at least one raised land and at least one recess relative to the land.

11. The valve according to claim 10 wherein the latch element contiguously engages the at least one raised land in a latched configuration of the valve, and the latch element is at least partially disposed in the recess in a fired configuration of the valve.

12. A valve for a fire extinguishing system dispensing a fire extinguishing agent, the valve comprising: a housing including an ingress aperture and an egress aperture, the housing defines a cavity extending along a longitudinal axis between the ingress aperture and the egress aperture; a flow control apparatus disposed in the cavity to prevent or permit flow of the fire extinguishing agent from the ingress aperture to the egress aperture, the flow control apparatus includes—a rupturable disk having opposite first and second sides; an inlet ring including a first annular face contiguously engaging the first side of the rupturable disk; and an outlet ring including a second annular face contiguously engaging a radially outer portion of the second side of the rupturable disk, wherein at least a radially outer portion of the rupturable disk is clamped between the first and second annular faces; an annular spool defining a cylindrical body axially movable inside the housing along the longitudinal axis; an actuator apparatus including an electromechanical actuator, a bearing sleeve angularly movable outside of the housing around the longitudinal axis, and a latch element operably coupling the bearing sleeve and the annular spool; and a manual override apparatus including a lever pivotally disposed on the housing and a cam operably coupled to the lever and the bearing sleeve; wherein the cylindrical body comprises a hollow cylindrical body disposed around the longitudinal axis, a groove on an exterior surface of the cylindrical body, and an annular axial face pressing a radially inner portion of the rupturable disk against the first annular face of the inlet ring in a latched configuration of the valve.

13. The valve according to claim 12 wherein the latch element is at least partially disposed in the groove in the latched configuration of the valve, and the spool is displaced along the longitudinal axis away from the rupturable disk in a fired configuration of the valve.

14. The valve according to claim 1 wherein the spool comprises an annular axial face pressed against a radially inner portion of the rupturable disk in a latched configuration of the valve, and the annular axial face is spaced from the radially inner portion of the rupturable disk in a fired configuration of the valve.

15. The valve according to claim 1 wherein the manual override apparatus comprises a shaft coupling the lever and a cam, and the shaft includes a first portion pivotally supporting the lever relative to the valve base and includes a second portion pivotally supporting the cam relative to the valve body.

16. The valve according to claim 1, further comprising a resilient element biasing the bearing sleeve toward a latched configuration of the valve.

17. A valve for dispensing a fire extinguishing agent from a container, the valve comprising:
a housing including an ingress aperture and an egress aperture, the housing defines a cavity extending along a longitudinal axis between the ingress aperture and the egress aperture;
a rupturable disk disposed in the cavity to control a flow of the fire extinguishing agent from the ingress aperture to the egress aperture, the rupturable disk having a line of weakness at least partially disposed around the longitudinal axis, the rupturable disk having a burst rating greater than a maximum pressure of the fire extinguishing agent in the container,
an annular spool defining a cylindrical body with a flow-through aperture along the longitudinal axis, the annular spool having an axial face engaging the rupturable disk in a latched position of the annular spool along the longitudinal axis, wherein the annular spool supports the rupturable disk and conceals the line of weakness from the ingress aperture in the latched position, and
an actuator operably coupled to the spool, wherein the spool responds to the actuator to move along the longitudinal axis to a fired position that exposes the line of weakness to allow the flow of fire extinguishing agent through the flow-through aperture of the spool and from the egress aperture of the housing.

18. The valve according to claim 17, further comprising a clamp supporting the rupturable disk with respect to the housing.

19. The valve according to claim 17 wherein moving the spool from the latched position to the fired position adjusts a diameter of the clamp supporting the rupturable disk.

20. The valve according to claim 17 wherein the actuator comprises at least one of an electro-mechanical actuator and manually actuated actuator.

21. The valve according to claim 17 wherein the actuator comprises:
at least one latch element configured to engage the annular spool in the latched position and to disengage the annular spool in the fired position; and
a sleeve cincturing the housing, the sleeve including a first portion configured to retain the at least one latch element in the latched position and a second portion configured to release the at least one latch element in the fired position.

22. The valve according to claim 21 wherein the actuator rotates the sleeve about the longitudinal axis relative to the housing.

23. The valve according to claim 21 wherein the actuator translates the sleeve along the longitudinal axis relative to the housing.

24. The valve according to claim 17 wherein the actuator comprises:
a latch element configured to engage the annular spool in the latched position and to disengage the annular spool in the fired position; and
a cam configured to retain the latch element in the latched position and to release the at least one latch element in the fired position.

25. The valve according to the claim 17 wherein the actuator is nominally configured with a projection extended from a housing.

26. The valve according to the claim 17 wherein the actuator is nominally configured with a projection retracted into a housing.

27. The valve according to claim 17 wherein the annular spool tilts with respect to the longitudinal axis between the latched and fired positions.

28. The valve according to claim 17 wherein the actuator comprises a latch element configured to couple the housing and the annular spool in the latched position and to decouple the housing and the annular spool in the fired position.

29. The valve according to claim 17 wherein the actuator is configured in a retracted arrangement in the latched position and configured in an extended arrangement in the fired position.

30. The valve according to claim 17 wherein the actuator is configured in an extended arrangement in the latched position and configured in a retracted arrangement in the fired position.

31. A method of controlling a flow of a fire extinguishing agent in a passage extending along a longitudinal axis from an ingress aperture to an egress aperture, a disk having a line of weakness at least partially cincturing the longitudinal axis occludes the passage to prevent the flow of the extinguishing agent from the ingress aperture to the egress aperture in a first arrangement, and the disk ruptures to permit the flow of the extinguishing agent from the ingress aperture to the egress aperture in a second arrangement, the method comprising:

concealing the line of weakness between first and second annular faces in the first arrangement; and revealing the line of weakness by moving a cylindrical body that provides the first annular face relative to the second annular face in the second arrangement.

32. The method according to claim 31 wherein concealing the line of weakness comprises clamping the disk between the first and second annular faces.

33. The method according to claim 32 wherein the first and second annular faces are clamped together radially inward of the line of weakness relative to the longitudinal axis.

34. The method according to claim 31, further comprising securing a peripheral portion of the disk to a housing defining the passage, the peripheral portion of the disk being radially outward of the line of weakness relative to the longitudinal axis.

35. The method according to claim 34 wherein the peripheral portion is welded to the housing.

36. The method according to claim 31 wherein concealing the line of weakness comprises a set of latch elements preventing the first annular face to move relative to the second annular face in the first arrangement, and revealing the line of weakness comprises the set of latch elements permitting the first annular face to move relative to the second annular face in the second arrangement.

37. The method according to claim 36 wherein individual latch elements move radially relative to the longitudinal axis between the first and second arrangements.

38. The method according to claim 36, further comprising rotating a sleeve about the longitudinal axis between first and second angular orientations relative to a housing defining the passage, the first angular orientation blocks moving the set of latch elements from the first arrangement to the second arrangement, and the second angular orientation releases the set of latch elements from the first arrangement to the second arrangement.

39. The method according to claim 36, further comprising displacing a protracting actuation device between a retracted position and an extended position, a first one of the retracted and extended positions blocks moving the set of latch elements from the first arrangement to the second arrangement, and a second one of the retracted and extended positions releases the set of latch elements from the first arrangement to the second arrangement.

40. The method according to claim 31 wherein concealing the line of weakness comprises a protracting actuation device disposed in a first one of a retracted position and an extended position, and revealing the line of weakness comprises the protracting actuation device disposed in a second one of the retracted and extended positions.

41. The method according to claim 40 wherein the protracted actuation device contiguously engages the cylindrical body comprising the first annular face.

42. The method according to claim 41, further comprising the cylindrical body moving along the longitudinal axis in response to the protracting actuation device moving between the retracted and extended positions.

43. The method according to claim 41, further comprising the cylindrical body tilting relative to the longitudinal axis in response to the protracting actuation device moving between the retracted and extended positions.

* * * * *